(12) United States Patent
Davis et al.

(10) Patent No.: US 10,429,869 B2
(45) Date of Patent: Oct. 1, 2019

(54) WIRELESS POWER, LIGHT AND AUTOMATION CONTROL

(71) Applicant: Kortek Industries Pty Ltd, Brisbane (AU)

(72) Inventors: Barrie Davis, Sanctuary Cove (AU); Benjamin Davis, Alderly (AU); Matthew Davis, Sanctuary Cove (AU)

(73) Assignee: Kortek Industries Pty Ltd, Brisbane (AU)

( * ) Notice: Subject to any disclaimer, the term of this patent is extended or adjusted under 35 U.S.C. 154(b) by 0 days.

(21) Appl. No.: 15/287,739

(22) Filed: Oct. 7, 2016

(65) Prior Publication Data

US 2017/0023963 A1 Jan. 26, 2017
US 2017/0344042 A9 Nov. 30, 2017

Related U.S. Application Data

(63) Continuation of application No. 13/985,549, filed as application No. PCT/AU2011/001666 on Dec. 29, 2011, now Pat. No. 9,465,377.

(Continued)

(51) Int. Cl.
| | |
|---|---|
| *G05F 1/66* | (2006.01) |
| *H04W 84/18* | (2009.01) |
| *H04W 48/16* | (2009.01) |
| *G05B 15/02* | (2006.01) |
| *H05B 37/02* | (2006.01) |
| *H04L 12/28* | (2006.01) |

(Continued)

(52) U.S. Cl.
CPC ............... *G05F 1/66* (2013.01); *G05B 15/02* (2013.01); *H04L 12/282* (2013.01); *H04L 12/2809* (2013.01); *H04W 4/80* (2018.02); *H04W 48/16* (2013.01); *H04W 84/18* (2013.01); *H05B 37/0272* (2013.01); *G05B 2219/2642* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,830,041 B2 | 11/2010 | Yang et al. | |
| 7,964,989 B1 * | 6/2011 | Puschnigg | ............. G06F 1/266 307/116 |

(Continued)

FOREIGN PATENT DOCUMENTS

| | | |
|---|---|---|
| CN | 1925527 | 3/2007 |
| CN | 101253657 | 8/2008 |

(Continued)

OTHER PUBLICATIONS

Lim et al. "Wireless Intrusion Detection and Response", 2003 IEEE.*

(Continued)

*Primary Examiner* — Carlos R Ortiz Rodriguez
(74) *Attorney, Agent, or Firm* — Martin IP Pty Ltd

(57) ABSTRACT

A power control unit and method of use thereof for varying the supply of electricity to an electrical apparatus using a peer-to-peer wireless communications link between a controller and the power control unit. The communications link may be established using Wi-Fi Direct or Bluetooth communications technology.

23 Claims, 15 Drawing Sheets

Related U.S. Application Data

(60) Provisional application No. 61/556,751, filed on Nov. 7, 2011, provisional application No. 61/468,119, filed on Mar. 28, 2011, provisional application No. 61/443,714, filed on Feb. 16, 2011.

(51) Int. Cl.
*H04W 4/80* (2018.01)
*H04W 84/12* (2009.01)

(56) References Cited

U.S. PATENT DOCUMENTS

| | | | |
|---|---|---|---|
| 8,429,404 B2* | 4/2013 | Greenstein | H04L 63/0823 709/229 |
| 8,462,734 B2 | 11/2013 | Laine et al. | |
| 8,901,769 B2 | 12/2014 | Altonen et al. | |
| 9,088,663 B2 | 7/2015 | Arling et al. | |
| 9,465,377 B2 | 10/2016 | Barrie et al. | |
| 2005/0152306 A1* | 7/2005 | Bonnassieux | H04W 84/22 370/328 |
| 2007/0271006 A1 | 11/2007 | Golden et al. | |
| 2008/0114997 A1* | 5/2008 | Chin | H04L 12/10 713/321 |
| 2008/0183307 A1 | 7/2008 | Clayton et al. | |
| 2008/0183853 A1 | 7/2008 | Manion et al. | |
| 2010/0271802 A1 | 10/2010 | Recker et al. | |
| 2010/0290788 A1 | 11/2010 | Feldstein et al. | |
| 2010/0297941 A1 | 11/2010 | Doan et al. | |
| 2011/0026504 A1 | 2/2011 | Feinberg | |
| 2011/0082939 A1* | 4/2011 | Montemurro | H04W 76/023 709/227 |
| 2012/0109658 A1 | 5/2012 | Wu | |
| 2012/0151089 A1 | 6/2012 | Ponmudi et al. | |
| 2013/0142181 A1 | 6/2013 | Makim et al. | |
| 2014/0244044 A1 | 8/2014 | Davis et al. | |
| 2014/0244045 A1 | 8/2014 | Davis et al. | |
| 2014/0244063 A1 | 8/2014 | Davis et al. | |

FOREIGN PATENT DOCUMENTS

| | | |
|---|---|---|
| JP | 10-282161 | 4/1997 |
| JP | H10-282161 A | 10/1998 |
| JP | 2007215367 A | 8/2007 |
| JP | 2008241185 A | 9/2008 |
| JP | 3162059 | 8/2010 |
| WO | 2010111426 | 9/2010 |

OTHER PUBLICATIONS

Mikhail Galeev: "Home networking with Zigbee", Apr. 20, 2004, pp. 1-7, XP055272146, available on the internet http://www.embedded.com/print/4006430.

Search Report and Written Opinion dated Jan. 31, 2012 for PCT/AU2011/001666, filed Dec. 29, 2011, titled Wireless Power, Light and Automation Control, 7 pages.

"Wi-FI Certified Wi-Fi Direct™, Personal, portable Wi-Fi technology", Wi-Fi Alliance, Oct. 2010, p. 1-14. Industry White Paper, Available on: http://www.wi-fi.org/knowledge-center/white-papers/wi-fi-certified-wi-fi-direct%E2%84%A2-personal-portable-wi-fi%C2%AE-technology-2010. Chapters: Executive summary, WiFi Technologies Evolves, WiFi Direct, Technology Basics, Key Mechanisms and Important Capabilities, Fig.3.

Ennis, G: "Wi-Fi Connectivity Options for Smart Grid", Grid Interop Chicago, Dec. 2010., p. 1-18. Available on the Internet at: http:/www.gridwiseac.org/pdfs/forum_papers1 O/ennispre_gi1 O.pdf Whole document.

Hiromitsu, S; et al: "Home Appliance Control From Mobile Phones", 4th IEEE Consumer Communications and Networking Conference 2007, Jan. 2007, Las Vegas, p. 793-797. Abstract, Figs.1, 6, Chapter V. Prototype Implementation.

Revolution Wi-Fi: "Wi-Fi Direct Formally Certifies Soft-AP Functionality", Internet Article, Oct. 30, 2010. (Oct. 30, 2010), pp. 1-5, XP002757688, Internet Retrieved from the Internet: URL:http://www.revolutionwifi.net/revolutionwifi/2010/10/wi-fi-direct-formally-certifies-soft-ap.html [retrieved on May 10, 2016] the whole document.

An extract from Extended European Search Report issued on EP 118588060 (PCT/AU2011001666) dated May 25, 2016.

* cited by examiner

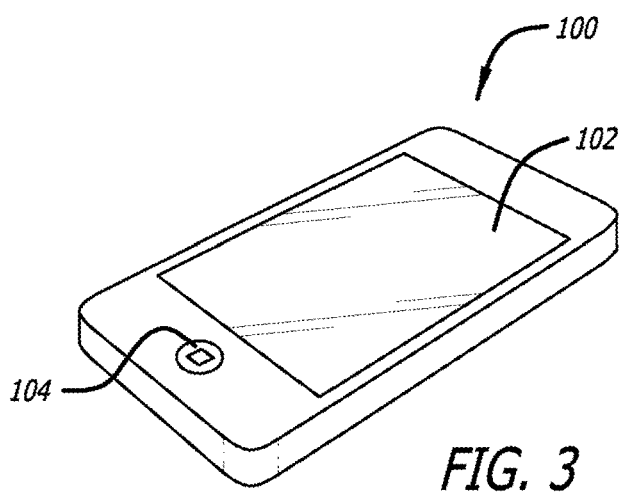
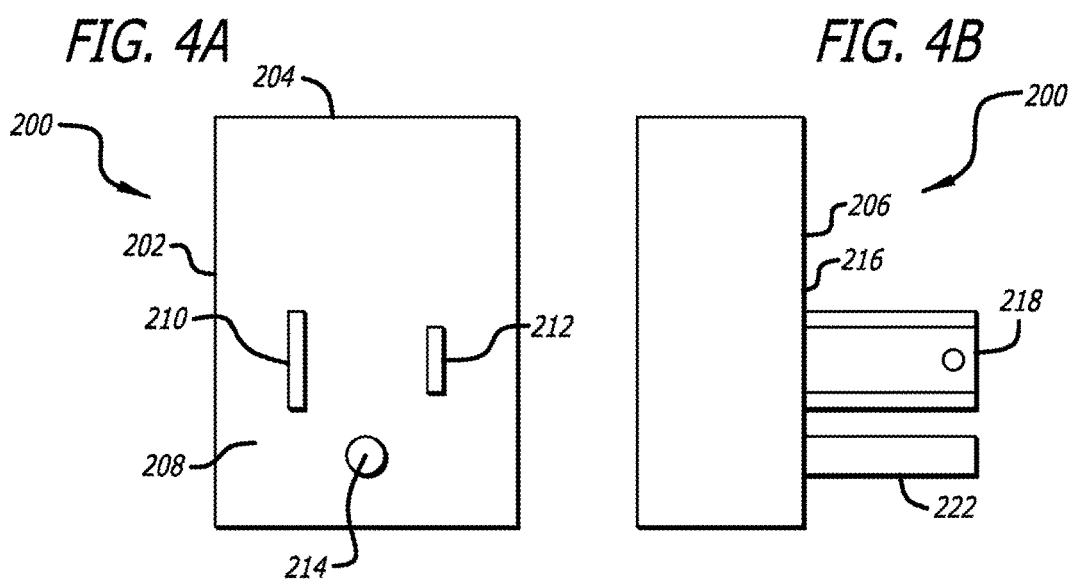
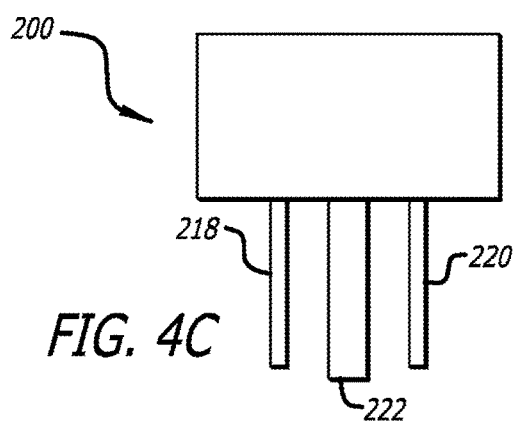

WIRELESS POWER, LIGHT AND AUTOMATION CONTROL

FIELD OF INVENTION

The present invention relates to the control of mains power, lighting and automation in domestic and commercial applications using standard Wi-Fi devices such as smartphones, tablets, notebooks, laptops, netbooks and ultrabook computers and similar items to act as a controller for the system utilizing a wireless peer-to-peer communications link between the devices. For ease of reference, the present invention will be described in relation to smartphones, though it will be understood that the invention is not so limited.

BACKGROUND OF INVENTION

In recent years, there has been significant growth in wireless technology being used to control mains powered appliances, lighting systems and building heating and cooling. These systems are normally installed in large buildings and provide efficient control of the entire local environment.

The proliferation of domestic wireless networks for connecting computers to the Internet and sharing peripherals such as modems, printers, etc., has created a ready-made framework for wireless home automation. In most cases these networks use wireless technology that conforms to the Wi-Fi Alliance specifications and is generally known as "Wi-Fi." More specialized systems use proprietary networks outside of general Wi-Fi architecture and conform to specifications such as Zigbee or others. In essence the network arrangements are similar, but not compatible.

Conventional Wi-Fi networks are typically based on the presence of a specific control device known as a wireless Access Point. These devices provide physical support for the wireless network, perform bridging and routing between devices on the network, and allow devices to be added or removed from the network. A typical home Wi-Fi network usually includes a wired connection to the telephone Wide Area Network (WAN) for broadband Internet services, with a number of computers, printers, tablets, smartphones, and similar devices connected wirelessly to the Access Point. The connected devices do not communicate directly with each other, but do so through the Access Point that acts as a gateway for all communications.

It can be appreciated that home automation based on a Wi-Fi network requires the provision of a wireless Access Point and a user interface device such as a PC for even the most basic system. Because all communications have to pass through the network's Access Point, if it becomes disabled for any reason, the entire home automation system fails. If there are other high traffic devices attached, the Access Point can also become overloaded to the point that data latency inhibits the home automation functions.

SUMMARY

In one preferred embodiment, the present invention includes two parts: a power control device or unit which plugs into a standard mains power outlet used to provide power to connected electrical or electronic devices, and a hand held, battery powered controller which is able to communicate with the power control unit via a short range wireless link.

The power control unit is a device which has functions specific to the desired requirements of the system. The controller may be a commercially available cellular or mobile phone with the computing power, graphics display and wireless communications capability to be in the class of phones known as a smartphone. A preference for a smartphone to be used as a controller for the invention is due to the ability to load and run an application program on the smartphone operating system.

The controller is an interface between the user and the power control unit. By entering an appropriate command into the controller, the user can activate the power control unit functions. In one preferred application, the switch unit version of a power control unit may have the single function of controlling the switching of mains power to an attached electrical or electronic device in response to commands issued by a user via the controller. In this instance, the switch unit can be out of sight and still controlled via the wireless link between the switch unit and the controller. The controller also need only be a simple device which essentially instructs the switch unit to connect or disconnect mains power to the attached device. The controller is preferably a hand-carried, mobile device such as a smartphone or tablet, and not a device that is typically stationary, such as a desk-top computer.

In another preferred embodiment, the present invention may have a power control unit that has an extensive range of functions more in line with a permanently wired home automation system. In this case, the controller may be more complicated and could incorporate a graphics interface so the user could easily control functions they desire.

The power control unit is preferably able to perform the wireless communications functions utilizing Wi-Fi Direct technology. As used here, "Wi-Fi Direct" refers to the Wi-Fi Alliance's Wi-Fi Direct specification, which is amended from time to time. The term "Wi-Fi Direct device" refers to a device configured to initiate, using Wi-Fi Direct technology, communication with another device.

The controller is preferably a cellular or mobile phone commonly known as a smartphone which supports Wi-Fi or legacy Wi-Fi. As used herein, "legacy Wi-Fi" refers to the IEEE 802.11a/g/n Wi-Fi specification. The controller may also support the Wi-Fi Direct specification and other wireless communications specifications such as Bluetooth. Unless otherwise noted, the controller will be described in terms of a smartphone, though the invention is not so limited. For example only, the controller may be any portable device which can download or install by other means an applications program, have a suitable interface to the user so they can interact with the applications program to have it execute the required functions and have either legacy Wi-Fi and/or Wi-Fi Direct capability to enable communications to be established with a power control unit. Examples of such devices are tablets, laptops and notebook personal computers.

Most smartphones that support the Apple, Inc. iOS, Google, Inc. Android or Microsoft, Inc. Windows operating systems also support IEEE 802.11 which allows the user to connect to an appropriate Wi-Fi Access Point and then to the Internet in the same way as any other computer connects to a Wi-Fi network. While this has become the minimum wireless communications standard, smartphones are now starting to support Wi-Fi Direct natively. For smartphones that include Wi-Fi Direct capability as well as legacy Wi-Fi, a preferred communications method between the power control unit and the smartphone would be a Wi-Fi Direct peer-to-peer communications link.

There are other wireless standards available that could be used to implement the wireless link, such as Bluetooth, Zigbee, and Near Field Communications. Alternatively a simple Frequency-shift Keying (FSK) system operating in one of the unrestricted radio frequency bands could also be used.

Specifically, it should be noted that most smartphones also support the Bluetooth wireless specification Bluetooth SIG class 2.1+EDR or later. As with Wi-Fi Direct, Bluetooth is also a peer-to-peer wireless communications method and could be used to provide similar capability for some embodiments of the invention without changing the originality and function of the invention as described herein.

The present invention in one preferred aspect provides a power control device for controlling an electrical apparatus through a peer-to-peer link with a controller so as to control a supply of electricity to the electrical apparatus. The controller has a processor, a memory, a user interface, and a wireless communications transceiver. The device includes a microprocessor having a memory; a power control circuit configured to implement a command from the microprocessor to vary the supply of electricity to the electrical apparatus; and a wireless communications transceiver operable for two-way, peer-to-peer communication with the controller. The microprocessor is configured to open a peer-to-peer wireless communications link with the controller by either: simulating a Wi-Fi access point if the controller is a legacy Wi-Fi device; or negotiating with the controller as to which of the microprocessor or the controller will assume a group owner role if the controller is a Wi-Fi Direct device.

As used herein, "simulating an access point" (or variations thereof) refers to a role in which a discovery message is sent in order to initiate contact with another device.

In another preferred aspect, the present invention provides a method for remotely controlling an electrical apparatus to control a supply of electricity to the electrical apparatus. The method includes opening a secure two-way, peer-to-peer wireless communications link between a wireless controller and a power control device, the power control device controlling the supply of electricity to the electrical apparatus, the opening of the peer-to-peer wireless communications link including: assigning a Wi-Fi access point role to the power control device if the controller is not utilizing Wi-Fi Direct to communicate with the power control device; or if the controller is utilizing Wi-Fi Direct to communicate, negotiating between the power control device and the controller which of the power control device and controller will assume a Wi-Fi Direct group owner role; displaying on a user interface of the wireless controller a status of the power control device; transmitting a command with the wireless controller over the peer-to-peer wireless communications link to the power control device to vary the supply of electricity to the electrical apparatus; receiving the command at the power control device; and varying the supply of electricity to the electrical apparatus in accordance with the command.

In another preferred aspect, the present invention provides a power control device for controlling an electrical apparatus through a peer-to-peer link with a controller so as to control a supply of electricity to the electrical apparatus. The controller has a processor, a memory, a user interface, and a wireless communications transceiver. The power control device includes a microprocessor having a memory; a power control circuit configured to implement a command from the microprocessor to vary the supply of electricity to the electrical apparatus; and a wireless communications transceiver operable for two-way, peer-to-peer communication with the controller. The microprocessor is configured to always send a discovery message to initiate contact with the controller to open a peer-to-peer wireless communications link with the controller.

In another preferred aspect, the present invention provides a method for remotely controlling an electrical apparatus to control a supply of electricity to the electrical apparatus. The method includes opening a secure two-way, peer-to-peer wireless communications link between a wireless controller and a power control device, the power control device controlling the supply of electricity to the electrical apparatus, the power control device always send a discovery message to initiate contact with the wireless controller to open the peer-to-peer wireless communications link with the controller; displaying on a user interface of the wireless controller a status of the power control device; transmitting a command with the wireless controller over the peer-to-peer wireless communications link to the power control device to vary the supply of electricity to the electrical apparatus; receiving the command at the power control device; and varying the supply of electricity to the electrical apparatus in accordance with the command.

In another preferred aspect, the present invention provides a power control device for controlling an electrical apparatus through a peer-to-peer link with a controller so as to control a supply of electricity to the electrical apparatus. The controller has a processor, a memory, a user interface, and a wireless communications transceiver. The device includes a microprocessor having a memory; a power control circuit configured to implement a command from the microprocessor to vary the supply of electricity to the electrical apparatus; and a wireless communications transceiver operable for two-way, peer-to-peer communication with the controller. The microprocessor is configured to negotiate with the controller whether the controller or the microprocessor will assume a group owner role while the device is linked to the controller.

In another preferred aspect, the present invention provides a method for remotely controlling an electrical apparatus to control a supply of electricity to the electrical apparatus. The method includes opening a secure two-way, peer-to-peer wireless communications link between a wireless controller and a power control device, the power control device controlling the supply of electricity to the electrical apparatus, the opening of the peer-to-peer wireless communications link including negotiating with the controller whether the wireless controller or the power control device will assume a group owner role while the wireless controller and the power control device are linked to each other; displaying on a user interface of the wireless controller a status of the power control device; transmitting a command with the wireless controller over the peer-to-peer wireless communications link to the power control device to vary the supply of electricity to the electrical apparatus; receiving the command at the power control device; and varying the supply of electricity to the electrical apparatus in accordance with the command.

BRIEF DESCRIPTION OF THE FIGURES

FIG. 3 is a perspective view of a smartphone in accordance with one preferred embodiment of the present invention.

FIG. 4A is a front elevation view showing a power control unit in accordance with one preferred embodiment of the present invention.

FIG. 4B is a side elevation view showing the power control unit of FIG. 4A.

FIG. 4C is a bottom plan view showing the power control unit of FIG. 4A.

FIG. 12A is an expanded view showing the connection of a plug into the power control unit of FIG. 12.

DETAILED DESCRIPTION OF THE DRAWINGS

Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow.

Figure 1:
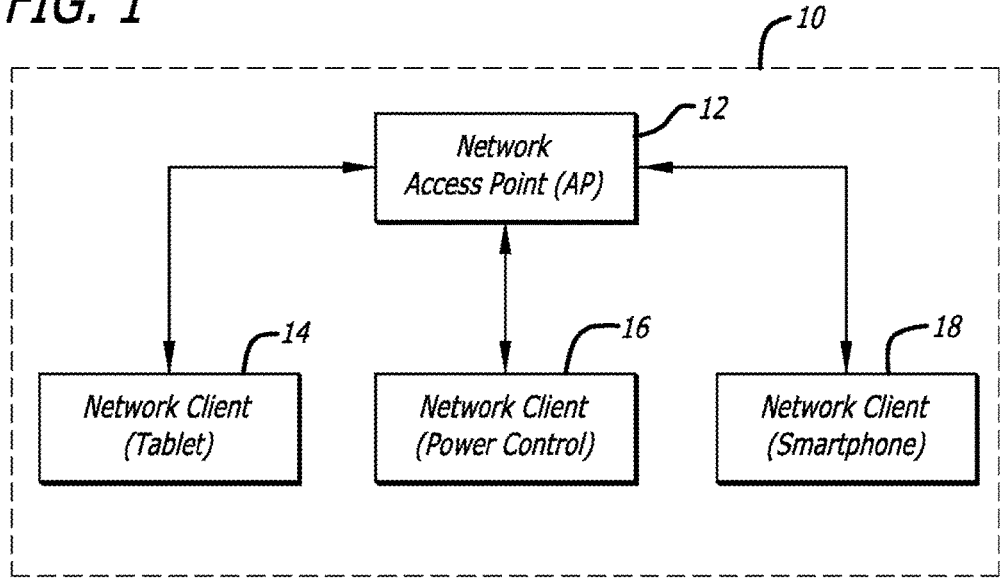
FIG. 1 is a block diagram of a wireless network.

FIG. 1 is a block diagram of a typical wireless network 10 which has an access point 12 as the network control unit or hub. Wirelessly connected to access point 12 are shown three network clients, although the number of network clients is only limited by the capabilities of access point 12. The network, for example, can have access point 12, a network client 14 (tablet), a network client 16, (power control device) and a network client 18 (smartphone). All communications over the network must pass through access point 12. For the smartphone to communicate with a power control device, it would actually communicate with the access point and the access point would pass any messages from the smartphone onto the power control device. The same happens for any messages the tablet sends to the power control device. Accordingly, it can be seen that: (1) access point 12 must always be operating for the network to be available for communications; (2) the network is limited to an area which is defined by the minimum radio transmission distance between a network client and the access point; (3) a minimum network requires an access point and at least one network client; and (4) at least one network client must be able to configure and maintain the access point operations.

Figure 2:
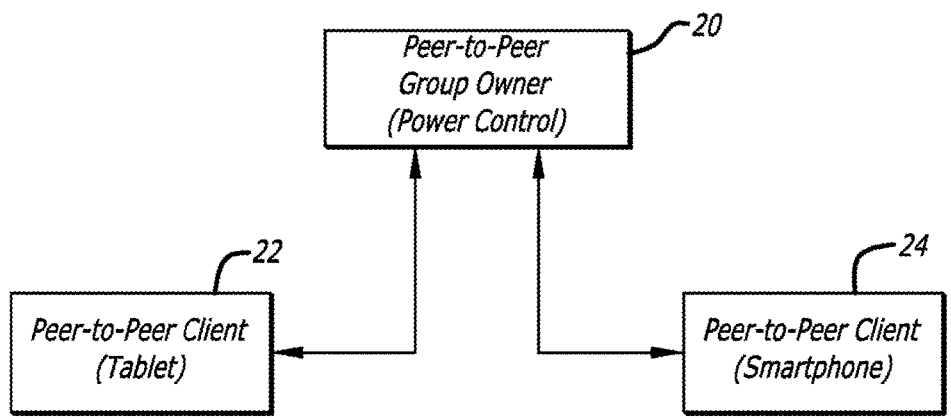
FIG. 2 is a block diagram of a wireless peer-to-peer group in accordance with one preferred embodiment of the present invention.

FIG. 2 is a block diagram of a wireless peer-to-peer group which has a group owner 20 (for example, a power control device or unit), a peer-to-peer client 22 (tablet) and a peer-to-peer client 24 (smartphone). In this case both peer-to-peer clients can wirelessly connect directly to the group owner (power control unit) without requiring the services of an access point. The power control unit will be described in further detail below. The group owner can set up 1:N connections if desired so that the tablet and the smartphone could have a communications link with the group owner at the same time. Alternatively, the group owner may restrict itself to 1:1 connections in which case it will only establish a communication link with one peer-to-peer client at a time. For example, in FIG. 2 the power control unit as group owner can choose to communicate with the tablet, the smartphone, or neither depending on the group owner access rules which have been established between the devices. Accordingly, it can be seen that: (1) a third device such as access point 12 is not required for peer-to-peer communications to be established; (2) the communications link is formed on an "as needed" basis; and (3) the only limitation on positioning of the group owner is that the client can be brought within radio range when a communications link is required to be established.

In one preferred embodiment, the power control unit is configured to use the capabilities of the Wi-Fi Direct specification to perform the functions of a Wi-Fi Access Point and appear to legacy Wi-Fi devices, such as smartphones, as a Wi-Fi Access Point. In this mode, the Wi-Fi Direct device is able to communicate with legacy Wi-Fi devices that support the IEEE 802.11 specification. This capability allows a Wi-Fi Direct device to form peer-to-peer links with legacy Wi-Fi devices on an as needed basis.

Wi-Fi Direct has a number of advantages which simplify communications between a power control unit and a smartphone operating as a controller. Significant advantages include the mobility and portability where the smartphone and the power control unit can be located anywhere with the only requirement that they are within radio range of each other when wireless communications needs to be established. Also, when the power control unit's radio is configured to operate according to the Wi-Fi Direct specification, it can connect to and communicate with any device which supports legacy Wi-Fi or Wi-Fi Direct communications. A further advantage is that the identity and services of each power control unit can be displayed on the smartphone's graphical display, allowing the user to determine whether a connection has been established. Wi-Fi Direct is able to provide secure communications between the smartphone and the power control unit through the Wi-Fi Direct encryption capability for transported messages ensuring the system is secure and only qualified devices can communicate with each other. Wi-Fi Direct facilitates peer-to-peer communications so that a user-determined unique wireless communications link is set up between the smartphone and the power control unit irrespective of other smartphones and power control units in the vicinity and within wireless range.

In a preferred embodiment, the power control unit has a Wi-Fi Direct radio that is set to preferably only operate as the Wi-Fi Direct Group Owner (GO). While Wi-Fi Direct devices are able to connect to other devices in 1:N groups (GO:N devices), when incorporated into a power control unit the functionality is restricted to a 1:1 or peer-to-peer connection. In this mode, any legacy Wi-Fi device will receive a device discovery message as if from a legacy Wi-Fi Access Point and be able to set up a communications link if the right is granted by the power control unit. The intricacies of establishing the communications link between a Wi-Fi Direct device and the legacy Wi-Fi devices are defined in the Wi-Fi Alliance specifications and would be understood by practitioners skilled in communications systems protocols.

As the development of smartphones continues with new models being released at an ever increasing rate, one of the enhancements starting to become available is the inclusion of Wi-Fi Direct in addition to legacy Wi-Fi. In one preferred embodiment of the present invention, if the power control unit radio receives a Wi-Fi Direct response to a device discovery message, the two devices will negotiate which device will be the Group Owner in accordance with the Wi-Fi Alliance Wi-Fi Direct specification as amended from time to time and a 1:1 or peer-to-peer Wi-Fi Direct communication link is established. The Wi-Fi Direct specifications allow any Wi-Fi Direct device to be the Group Owner, and depending on the capabilities of the device, the negotiation procedure determines the most suitable device to perform this role. Because the power control unit can control a significant amount of electrical power of up to 1,875 watts for a 110 volt domestic system or 2,400 watts for a 240 volt domestic system any connected device needs to be identified, authorised and limited to a 1:1 communications link between itself and the power control unit.

FIG. 3 is a perspective representation of smartphone 100 which uses a wireless link to communicate with the power control unit. The controller can take many forms from a simple device which allows the power control unit to be switched on or off through to an advanced controller used in a preferred embodiment which provides the user with a wide range of functions not previously available.

Smartphone 100 is preferably a commercially available smartphone such as, for example, the iPhone by Apple, Inc., the Blackberry by RIM Ltd., Google, Inc., Android-based products by HTC, Motorola, Samsung, Sony Ericsson, LG and others and Windows based products by Nokia and others. The basic functions the selected smartphone preferably include a touch sensitive graphical screen interface, a compatible radio transceiver (TX/RX) and the ability to run an application program (App) specific to the individual smartphone that provides a control interface for the wirelessly connected power control unit. As used herein, the term "Controller App" will be used to refer to an application program that provides the control interface for a wirelessly connected power control unit. While the functions of the Controller App will be essentially the same for all smartphones, each Controller App itself will need to be compatible with the smartphone operating system it is intended to run on including iOS, BlackBerry OS, Android, Windows Phone, or another applicable operating systems. Preferably, the smartphone incorporates Wi-Fi capability to allow the user to connect to the Internet via a Wi-Fi access point or "Hotspot".

FIGS. 4A to 4C and 5 show a preferred embodiment of the power control unit which has a form 200 and functional electronics 300 which together are referred to as the power control unit. The functional electronics will be described in further detail below. The body or housing 202 is preferably made from plastic to shield the user from the high voltage circuits contained within and to allow the easy transference of the radio frequency power used for communication between power control unit 200 and smartphone 100.

Front face 204 of power control unit 200 has a socket 208 with two slots 210 and 212 and semicircular hole 214 which are designed to accept NEMA 1-15 and NEMA 5-15 polarized or unpolarised plugs. The rear face of the power control unit has a plug 216 with two flat parallel non-coplanar blades 218, 220 and a round grounding pin or prong 222. The blades and prong preferably conform to the NEMA 5-15P North American mains power plug and can be inserted into any NEMA 5-15R socket or outlet. The slots and hole preferably conform to the NEMA 5-15R North American power socket or outlet and will accept any NEMA 1 (two prong) or NEMA 5 (three prong) plug.

The power control unit is preferably rated for a current of 15 amperes at a voltage of 125 volts. The described power control unit is preferably in accordance with the specifications of the National Electrical Manufacturers Association which is used in most of North America and 38 other countries. It will be appreciated that the power control unit may be configured according to the plug and socket, and current and voltage requirements of various countries without departing from the scope of the present invention.

Figure 5:
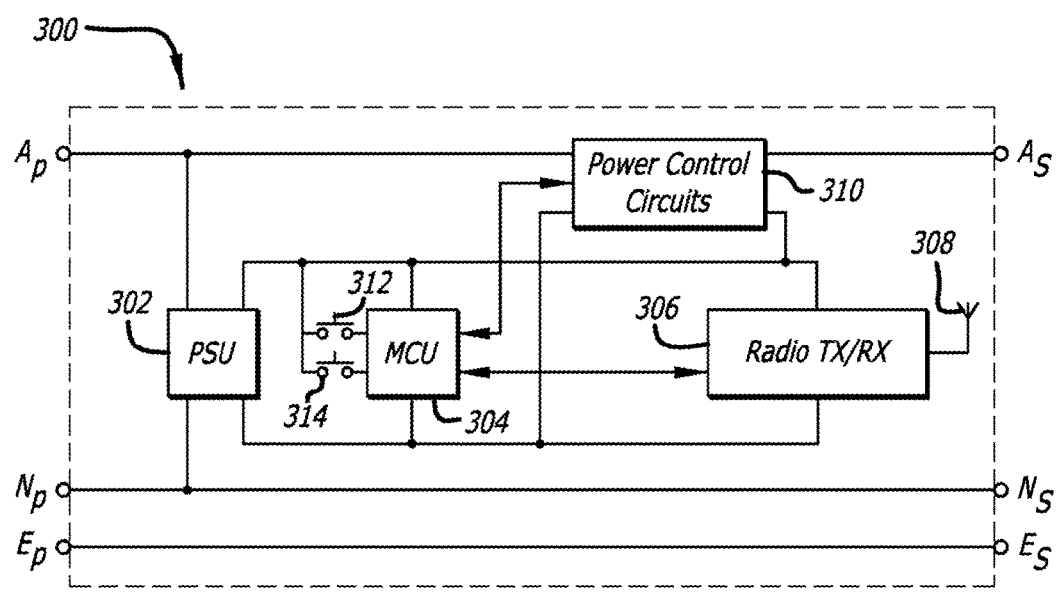
FIG. 5 is a block diagram of the functional electronics of the power control unit of FIG. 4A.

FIG. 5 shows a block diagram of the functional electronics of power control unit 300. The mechanical connections to the power control unit are the mains power plug terminals denoted Ap (active), Np (neutral) and Ep (earth). The power for the power control unit is derived directly from the mains power by Power Supply Unit (PSU) 302. The functions of the power control unit are preferably determined by Micro Controller Unit (MCU) 304 under directions of smartphone 100.

The commands and responses between MCU 304 and smartphone 100 are communicated through a radio frequency wireless link supported by radio 306 and aerial 308. The output socket of the power control unit used to connect attached electrical or electronic devices are As (active), Ns and Es. The Np and Ep input plug terminals are directly connected to the Ns and Es output sockets. The Ap plug terminal is connected to the As output socket via power control circuits 310 which are controlled by MCU 304 and allow the power control unit to connect and disconnect mains power to an attached appliance or device under instructions from the user through smartphone 100. Disconnect switch 312 allows the user to manually turn power control unit 300 OFF by causing power control circuits 310 to disconnect Ap from As. Connect switch 314 allows the user to manually turn power control unit 300 ON by causing power control circuits 310 to connect Ap to As.

Referring to FIGS. 4A to 4C, an electrical or electronic device plugs into the socket or outlet of the power control unit so that power control unit 300 is connected between the device and the socket or outlet which provides mains power. In this way, power control unit 300, using power control circuits 310, is able to control the mains power supplied to the connected device.

Power Supply unit PSU 302 is preferably always powered when the power control unit is plugged into a mains power outlet or socket which has mains power applied. PSU 302 converts the high voltage mains power, which can be up to 125 volts, to an appropriate voltage to power MCU 304, power control circuits 310 and radio 306.

MCU 304 preferably incorporates a firmware program which defines the operation and functions of the power control unit. When power is applied to the MCU, the MCU ensures power control circuits 310 are open and no power is sent to the attached appliance or device. The MCU then activates radio 306 and attempts to communicate with nearby smartphones.

Prior to being able to communicate with each other, smartphone 100 and power control unit 300 are paired using the wireless standard's pairing procedure. This only needs to be done once and then each time smartphone 100 is within wireless range of power control unit 300, smartphone 100 can initiate a dialog using the exchange of serial data commands and responses. Accordingly, smartphone 100 can send commands to power control unit 300 which, under the control of MCU 304 and its firmware, will execute those commands.

Smartphone 100 may be configured to setup a wireless link with a paired power control unit 300, but the commands which cause power control unit 300 to execute one or more of its functions are preferably determined by the Controller App. The Controller App preferably determines the commands and responses smartphone 100 exchanges with power control unit 300.

The Controller App is activated and controlled by the user through the smartphone's touch sensitive graphics screen 102 (FIG. 3). The Controller App may be preloaded on a specific device, or could be downloaded from an appropriate server through a wireless network, Internet or computer.

The Controller App is preferably programmed and designed to translate a user's requests inputted by the user via the smartphone's graphics screen 102 into specific commands that are transferred to the power control unit MCU 304 through the transmitter of smartphone 100 to radio 306 of the power control unit.

Figure 13:
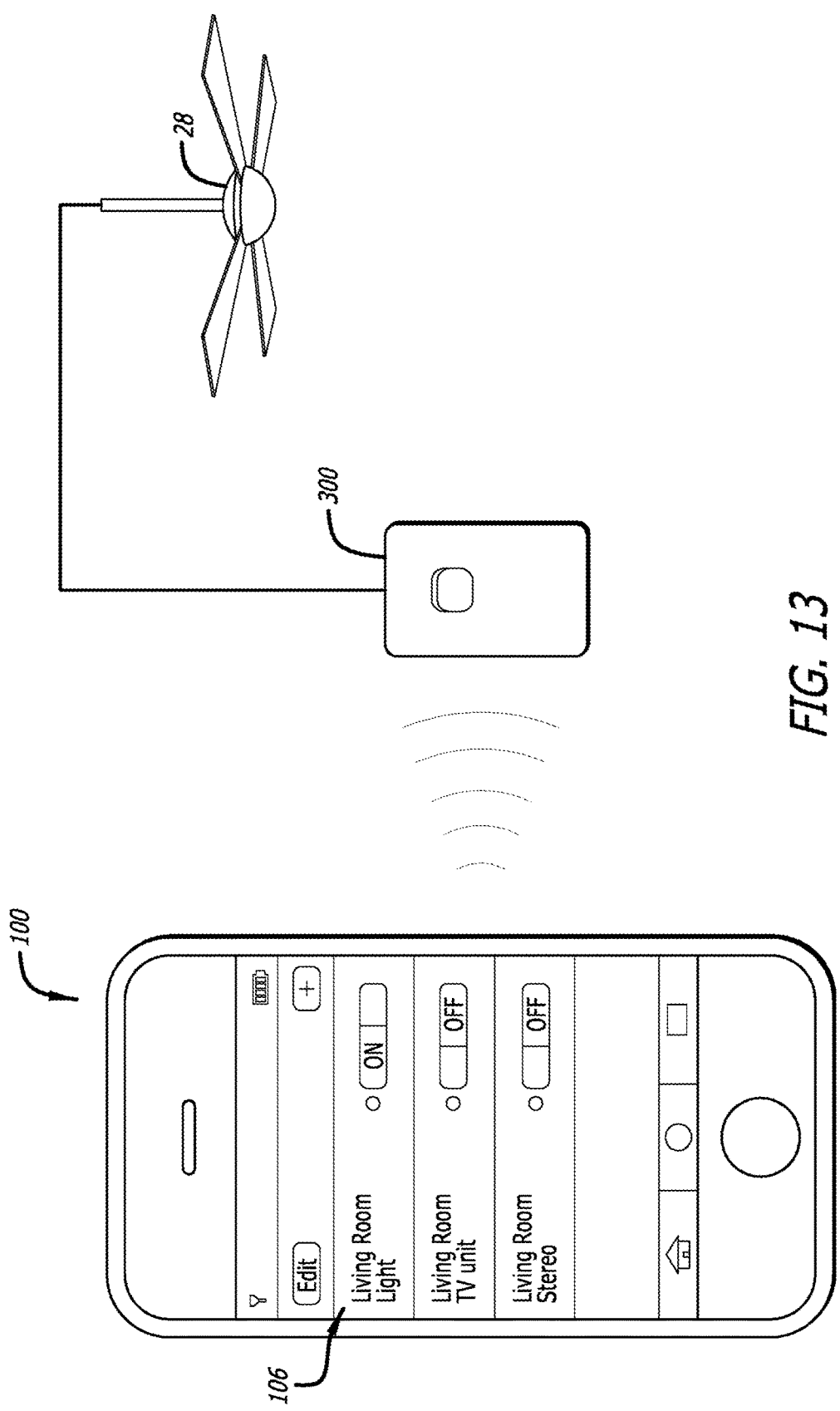
FIG. 13 is a pictorial schematic of another preferred embodiment of the present invention being used to directly control a home ceiling fan.

Referring to FIG. 3, to facilitate ease of use by the user, the Controller App preferably presents its control interface as a combination of graphics and text on graphics screen 102. Graphics screen 102 is also preferably touch-sensitive, allowing the Controller App to present a graphical picture of options to the user and then determine which of the options the user wants by determining how and where the user responds by touching the graphics screen. An example of a graphical picture presented by the Controller App is shown in FIG. 13 (Controller App 106). Typically the Controller App will be activated by the user touching the graphics screen in the vicinity of an icon representing the Controller App. The operating system will preferably load the Controller App as the currently operating App using the graphics screen so the user can proceed with instructions to the paired power control unit.

An important consideration in using touch sensitive graphics screen 102 as the interface between the smartphone and the user is the ease that the graphical presentation can be changed for different languages. While the icon images may remain the same, the graphical interface allows the text of, for example, an alphabetic language such as English to be replaced with, for example, a pictorial language such as Japanese by changing the graphics displayed on the graphics screen. The underlying functions represented on the screen preferably respond to the user's selection by touch irrespective of the language used for the display.

An example of a preferred interaction of the Controller App and the power control unit is set forth below. For purposes of this example, the pairing is assumed to be a single paired wireless connection. A standard feature of smartphones is a hierarchy of pages which can be accessed by selecting the appropriate icon displayed on graphics screen 102 or a physical button on the unit. Most icons represent a specific App such as a World Time Calendar, a Telephone Directory, a GPS Navigation System and the smartphone's telephone functions.

The Controller App is preferably represented by an icon on graphics screen 102 and when it is selected, the smartphone operating system activates the Controller App which presents the user interface on graphics screen 102. The user is able to select the function required from those available, and by touching the appropriate graphical representation, have that function executed.

An exemplary sequence of events in which smartphone 100 activates power control unit 300 is set forth below. It is assumed for ease of reference and not limitation that only one power control unit is present as previously determined by the smartphone.

When the user touches the Controller App icon on touch sensitive graphical screen 102 of smartphone 100, the smartphone's operating system activates the Controller App. The Controller App activates the radio of smartphone 100, which requests the status of any power control units in wireless range. Power control unit 300 responds with a message to smartphone 100 that includes the type of the power control unit. One option during the pairing process is to allocate a name to the power control unit so it can be easily identified by the user. This is particularly useful for more complex arrangements where multiple power control units are present. Names such as "TV" or "Stereo" can be associated with respective power control units which control the TV and stereo facilitating easy identification.

Although the power control unit can be a simple device in that it functionally switches electrical power to an attached electronic appliance or device, the way it can be instructed to do this by the user with the Controller App expands its functionality considerably.

Referring again to FIG. 5, at a simple level, the user can, using the Controller App, the smartphone operating system, the wireless communications link and MCU 304, make power control circuits 310 close to connect electrical power to an attached device or if closed, have power control circuits 310 open to disconnect electrical power to an attached device. The Controller App is also preferably configured to structure more complex functions by sending commands to the power control unit which define a sequence of events which the power control unit executes as a time sequence. An example is a countdown timer.

For some applications a simple switch on and switch off of the electrical power is not adequate. For example, if the power control unit is used to power a household iron used to smooth wrinkles from fabric, its use is intermittent. However, it is well known that the incidence of leaving an iron powered once its task is completed is high, which presents a danger of fire or injury to children and animals. The iron also consumes electrical power, which is a cost to both the user and the environment.

To use the power control unit as a countdown timer, the user selects the countdown timer function in a list of functions available in the Controller App. The Controller App will then request the user to select the length of time the appliance attached to the power control unit is to be powered. Again, the user selects the time period using the touch sensitive graphics screen by either selecting a pre-set interval of time, for example, 1 hour, or by entering a time period with the representation of a numeric keyboard, for example, 20 minutes.

When the user activates the countdown timer for the pre-set time period, the Controller App sends MCU 304 instructions to connect power to the attached appliance for the user nominated period and to then disconnect the power. The firmware in MCU 304 interprets the command from the Controller App and executes the requested function by closing power control circuits 310 for only the specified period of time.

If at any time the user wishes to terminate the countdown timer, they can do so by sending a disconnect request to the power control unit using the Controller App as described previously. Alternatively, if the power control unit is accessible to the user, the countdown timer can be terminated by pressing disconnect switch 312, which causes MCU 304 to disconnect power control circuits 310 immediately, thus terminating the countdown timer function. The termination function may be programmed to be available to the user at any time irrespective of whether the smartphone has a wireless link established with the power control unit.

It will be appreciated that many high level functions can be provided to a user of the power control unit using one or more application programs. One exemplary function is a period timer, where the power control unit connects power to a connected device at a predetermined clock time for a predetermined period. Single or multiple daily start and stop times, selected day timers, repetition timers, combinational timers and many other functions are all possible and contemplated within the present invention.

It will be appreciated that power control unit 300 need not include a clock/calendar function which operates independently of smartphone 100. This does not inhibit the timer functions of power control unit 300 when it is not able to communicate with smartphone 100 because it is out of range or switched off. When a Timer function is initiated by a user, MCU 304 preferably determines the timing requirements relative to the time that the function was received from the Controller App with the smartphone.

Information that includes the current time and date is transferred to the MCU firmware specifically so that it can perform the function without any further intervention by the Controller App. If communications between MCU 304 and the Controller App cease, the absolute time parameters are preferably updated when the communications link is re-established, although this is not a necessary criteria to the operation of the power control unit. In some preferred embodiments, the power control unit includes a hardware clock/calendar function with battery backup which would allow more complex functions to be implemented and enable functions to be re-started if a mains power outage occurs.

In one or more preferred embodiments of the present invention, the Controller App can program the power control unit to automatically perform a function when a communications link is established and cease the function when the communications link is broken. Using this type of operation, the user could have the power control unit automatically activate a radio or other music source when the communications link is established with the smartphone and deactivate the connected device when the smartphone moves out of communications range. By using such a combination of functions, the user could automatically have music playing or lights switch on when they enter a room and have them switch off when they leave.

Power control unit 300 may additionally, or alternatively, store functions received from the smartphone and run them when the user presses connect switch 314. For example, using the Controller App, a user could program the power control unit to operate as a 30 minute countdown timer, which could be started by the Controller App. The user can also have the option of allowing the power control unit to start or repeat the desired operation by pressing connect switch 314. Once the power control unit is programmed, it may connect the attached appliance or device to the mains power for a period of, for example, 30 minutes each time the connect switch was pressed without requiring any further communications with the smartphone. It will be appreciated that at any time the user could terminate or change the function using the smartphone. It should be noted that disconnect switch 312 can be configured so that it cannot be disabled and will always terminate an operating function.

The above description of a countdown timer initiated by pressing the connect switch is just one example of the complex functions that can be sent to any one or more of the power control units, allowing them to start and finish a programmed operation independently of the Controller App. While a computational intensive system is preferably used to construct functions for the power control unit, the result is a device that can execute programmed tasks with a simple press of the connect switch. At some other time, the required task may be different, in which case the power control unit could be: (a) re-programmed using the Controller App with a new function to operate independently, (b) be controlled directly by the user using the Controller App running on the smartphone operating system, and/or (c) cleared of the store operation by pressing a combination of the exposed controls.

It will be apparent to those skilled in the art that the power control unit as described may be a simple device which has a number of basic functions. These basic functions can be combined with one or more time parameters in various ways to form complex functions. While the complexity resides mostly in the Controller App running on the smartphone operating system, the basic functions may be available in the power control unit for a complex function to be formed.

It is preferable to provide all aspects of the product's operation at the outset because any variations once a product enters the market can result in obsolescence of prior versions at worst, or the necessity to replace units if the newly available features become a requirement.

In one preferred embodiment of the present invention, the power control unit may be configured so that one or more functions may be updated or added. The control functions of a power control unit may be stored in reprogrammable memory which is preferably a semiconductor memory that retains its data when power is removed, but unlike other types of permanent memory, can be reprogrammed with new data if required. It is envisaged that over time additional functions will be required of a power control unit which were not provided in prior versions of the device. By using reprogrammable memory to store the power control unit programs for MCU 304 and/or radio 306, it is possible for new functional and/or application programs to be transferred from the smartphone to the power control unit.

This operation would normally be under the control of the user who would decide if they wanted to change the functions of their individual power control unit. However, this capability could also be implemented using a Controller App upgrade if the MCU or radio firmware needed to be upgraded. In some cases an upgrade may not be required, but in other cases the extended capability may be extremely necessary. To do this the user would activate a special procedure in the Controller App which would download the new power control unit functional and/or applications code from the appropriate server. The Controller App in conjunction with the MCU would then transfer the new firmware to the power control unit via the wireless communication link where it would be stored in the reprogrammable memory. A specific transfer mechanism in the power control unit functional firmware would load the new firmware and then execute a system reset which would transfer its operations to this new firmware effectively updating the functions of the power control unit. At the same time the power control unit firmware is updated, the Controller App could also be updated to ensure that the smartphone and power control unit functions remain compatible.

An example of how this capability may be used is if an original power control unit were provided with only the functions of an ON/OFF switch or an ON/(delay period)/OFF countdown timer. At some point later in time, another Controller App may be developed which includes the first two functions, but also a programmable event timer that cycles every 24 hours with a new ON/(delay period 1)/OFF/(delay period 2)/ON function. The power control unit physical hardware may be capable of providing this function, but the later-developed Controller App has not been included in the original MCU program because the later-developed Controller App was not available at the time the power control unit was manufactured. By using the reprogramming capability described above, the later-developed Controller App may update the power control unit so that it would recognize and process all three functions rather than only the two original functions programmed at the time of manufacture. This provides a capability not found in simple conventional control devices.

Each smartphone is individually "known" by the MCU so that more than one smartphone can be paired with each of the power control units. It is clear that each paired smartphone could have a different set of functions or "user profiles" which describe how those particular users require the power control units to operate.

Before a power control unit can communicate with a particular smartphone via its wireless capability, ordinarily the two devices will be "paired" with each other. This process validates the association between the smartphone and the power control unit so that on future occasions the power control unit can identify the smartphone and accept it as an authorized device as opposed to any other device which is not approved. In the case of power control unit 300, it is preferably placed into "pairing mode," by having it plugged into a mains power outlet and the user pressing and holding disconnect switch 312 for more than 10 seconds. It will be appreciated that the paring interval may be more or less than 10 seconds. If the smartphone is also in "pairing mode," it will recognize the request from power control unit 300 to "pair," and both devices will exchange information to complete the "pairing" process. The Controller App running on the smartphone will indicate to the user when the "pairing" process is completed. Pairing is usually only needed once for each smartphone that the user desires to use to control a particular power control unit. Preferably each power control unit can "pair" with more than one smartphone if desired. It will be appreciated that other "pairing" methods are possible.

When a power control unit is manufactured, preferably the sole operating function is as a simple switching device where pressing connect switch 314 causes power control circuits 310 to connect the attached device to the mains power. The connection is maintained until disconnect switch 312 is pressed, which causes power control circuits 310 to disconnect the attached device from the mains power.

As set forth above, the user may use the Controller App to program the power control unit with the countdown timer function. The power control unit can also be manually configured as a simple countdown timer to control power to electrical equipment and appliances. To manually program the countdown time, the user preferably presses and holds disconnect switch 312 and within 10 seconds, presses and releases connect switch 314. On the release of connect switch 314, power control unit 300 enters the countdown timer program mode with an initial delay of, for example only, 30 minutes. If the user then releases disconnect switch 314, power control unit 300 will execute the countdown timer function with a 30 minute delay each time connect switch 314 is pressed and released. It will be appreciated that other time intervals may be programmed in a similar way.

To reset a power control unit, both the connect and disconnect switches are preferably pressed at the same time for greater than 5 seconds. At the end of the 5 second period, any stored functions are cancelled and the power control unit reverts to its basic function, which in the example of power control unit 300, is preferably an ON (connect switch 314) and OFF (disconnect switch 312) power switching device for connecting attached equipment and/or appliances to the mains power.

Each time the Controller App sends a function command to the power control unit, this function is preferably stored in memory and replaces the previous command. Whenever the start switch is pressed, it is the last stored function that is activated. It can be seen that in some instances it would be convenient to temporarily activate a different function, but still keep the primary function as the one which is held in memory. This is possible by using the Controller App temporary function mode where the Controller App sequences the required function directly by sending the appropriate function commands to the power control unit. In this example, the power control unit does not store the function commands, but executes them as they are received from the Controller App. When the function is terminated, or the power control unit loses the communications link with the smartphone, the last stored function is re-activated. The temporary function mode preferably only remains valid while the communications link between the smartphone and the power control unit is active.

Figure 6:
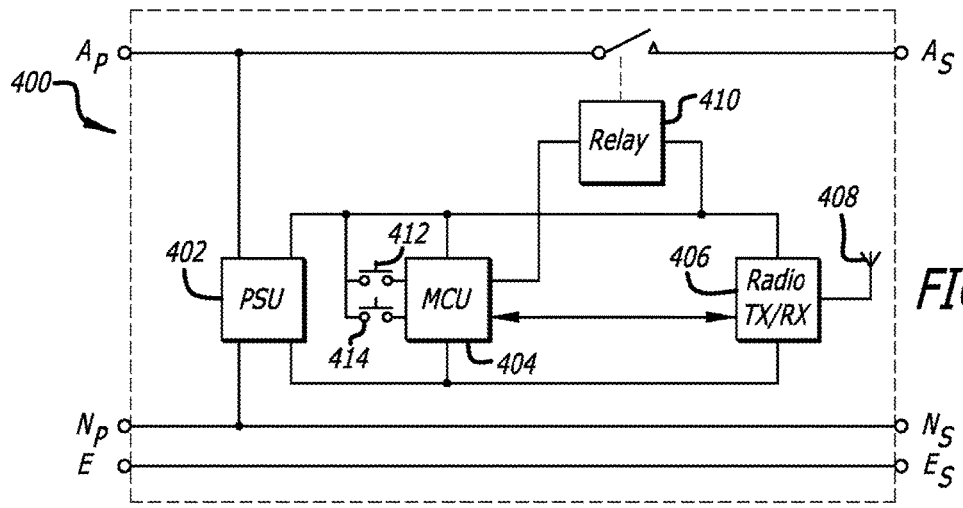
FIG. 6 is a block diagram of the functional electronics of a switch unit in accordance with another preferred embodiment of the present invention.

Referring now to FIG. 6, a switch unit 400 is shown in accordance with another preferred embodiment of the present invention. Switch unit 400 is similar to power control unit 300 except that power control circuits 310 are formed as a relay 410.

For many cases, a simple, low cost relay is adequate to perform the connection and disconnection of the mains power to the connected appliance or device. Except for complex power control functions, all of the functions and capability of power control unit 300 could be available for switch unit 400. Switch unit 400 therefore provides a simple, cost effective way to control power to various electronic devices and appliances.

In another preferred embodiment of the present invention, the power control unit may be formed as a wall outlet switch unit, which may be configured in a way similar to that shown in FIG. 6. The functions of the wall outlet switch are preferably the same as switch unit 400.

The wall outlet switch is preferably a physical replacement for a standard electrical wall outlet. It connects to the electrical circuits in a building wall in a similar way and with a switch similar to switch 414, which turns the electricity on at the power outlet socket, and a switch similar to switch 412, which turns the electricity off to the power outlet socket.

The wall outlet switch can also link to a Controller App running on a smartphone operating system in a way similar to that of switch unit 400 described above. All of the functions available to the switch unit may be available to the wall outlet switch.

Figure 7:
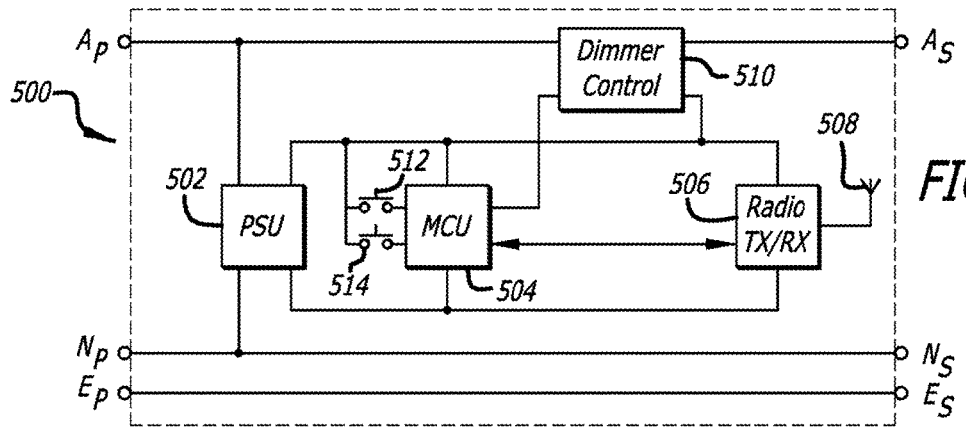
FIG. 7 is a block diagram of the functional electronics of a dimmer unit in accordance with further preferred embodiment of the present invention.

Referring now to FIG. 7, a dimmer unit 500 is shown in accordance with another preferred embodiment of the present invention. Dimmer unit 500 is similar to power control unit 300 except that power control circuits 310 include a dimmer control 510.

The dimmer unit is used to control and vary the amount of power transferred to attached lights which have the appropriate characteristics to allow the light output to be varied from fully on to fully off under control of the user using smartphone 100. The firmware for MCU 504 is preferably programmed specifically for the dimmer unit.

A preferred function of the dimmer unit is to control the amount of light emitted by a connected individual light or lighting system. Using dimmer control 510, which is under the control of MCU 504 and its firmware, the amount of electrical power transferred to the attached light is regulated. Because the electrical load presented to dimmer control 510 can be resistive, inductive or capacitive depending on the light type and arrangement, the dimmer unit can provide both leading edge and trailing edge dimming.

As with the power control unit 300, the user preferably controls the dimmer unit functions with the Controller App running on the smartphone operating system. When the Controller App establishes communication with MCU 504 via radio 506, the Controller App recognizes that a light dimming unit is to be controlled.

Instead of presenting the switch and timer functions to the user, the Controller App presents a set of functions applicable to the dimmer unit upon touching the dimmer unit icon on the smartphone's graphics screen. At the time of pairing, the user may be asked to specify the type of light connected to the dimmer unit so the correct dimming algorithm is used. On subsequent activations, the Controller App preferably allows the type of light selection to be changed if needed.

A preferred basic function of dimmer unit 500 is to switch the attached light ON if it is off, and OFF if it is on in a way similar to that of a light switch. At the same time, a graphical representation can be displayed on graphics screen 102 (FIG. 3) that represents the amount of light being emitted from the attached lighting system. Using graphics screen 102, the user will be able to input a touch gesture which may inform the Controller App that the user (a) wants the light intensity to change, (b) wants the light intensity to be increased or decreased depending on a user's specific touch input, (c) wants to specify the rate at which the user wants the light intensity to change and (d) wants to specify the amount of light to be emitted at the completion of the function.

The Controller Apps using the smartphone operating system and communications link, preferably instructs MCU 504 and its firmware of the required function, which is then executed in accordance with those instructions.

It may be appreciated that the basic function of dimmer unit 500 can be extended in the same way as the basic functions of power control unit 300. Options available to the user via the Controller App and graphics screen 102 may allow the dimming function to be delayed to a specified time, the light to be turned off at a specified time, the light to be turned on at a specified time, and off at a later time.

These and other functions can be selected by the user via the Controller App graphics display and the touch sensitive graphics screen 102 of the smartphone.

Dimmer unit 500 can be configured to support many of the same functions described above in relation to power control unit 300. For example, the connection and disconnection of the communications link with the smartphone can be the control function for dimmer unit 500 to connect and disconnect power to a light system. The timer function described above for power control unit 300 may be configured to operate with dimmer unit 500 and dimmer unit 500 is able to support multiple paired smartphones having different user profiles.

It will be appreciated that dimmer unit 500 can be built directly into a light pedestal or stand-alone light if desired.

Figure 8:
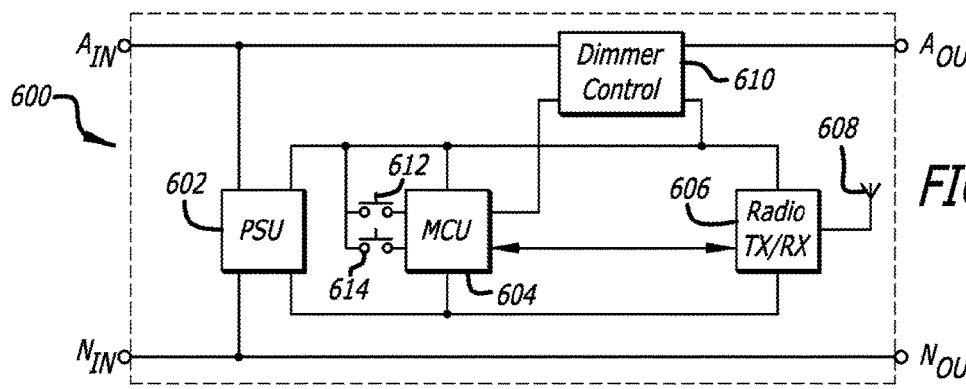
FIG. 8 is a block diagram of the functional electronics of a dimmer wall switch in accordance with an additional preferred embodiment of the present invention.

FIG. 8 is a block diagram of a wall dimmer unit 600. Wall dimmer unit 600 preferably has the same functions as dimmer unit 500 except it is physically mounted behind a standard domestic wall light dimmer plate and is interchangeable. Wall dimmer unit 600 allows light dimming functions to be extended to existing light installations by retrofitting.

Wall dimmer unit 600 is preferably a physical replacement for a standard electrical wall light switch. It connects to the electrical circuits in a building wall with switch 614 which turns the lights on and switch 612 which turns the lights off and functions in a similar way to a normal light switch.

Wall dimmer unit 600 can also connect to a Controller App running on a smartphone operating system in the same way as dimmer unit 500. All of the functions available to the dimmer unit may be made available to wall dimmer unit 600. It will be appreciated that multiple wall dimmer units may be mounted behind a single wall plate to provide a multi-circuit dimmer unit for the individual control of large areas of lighting.

Figure 9:
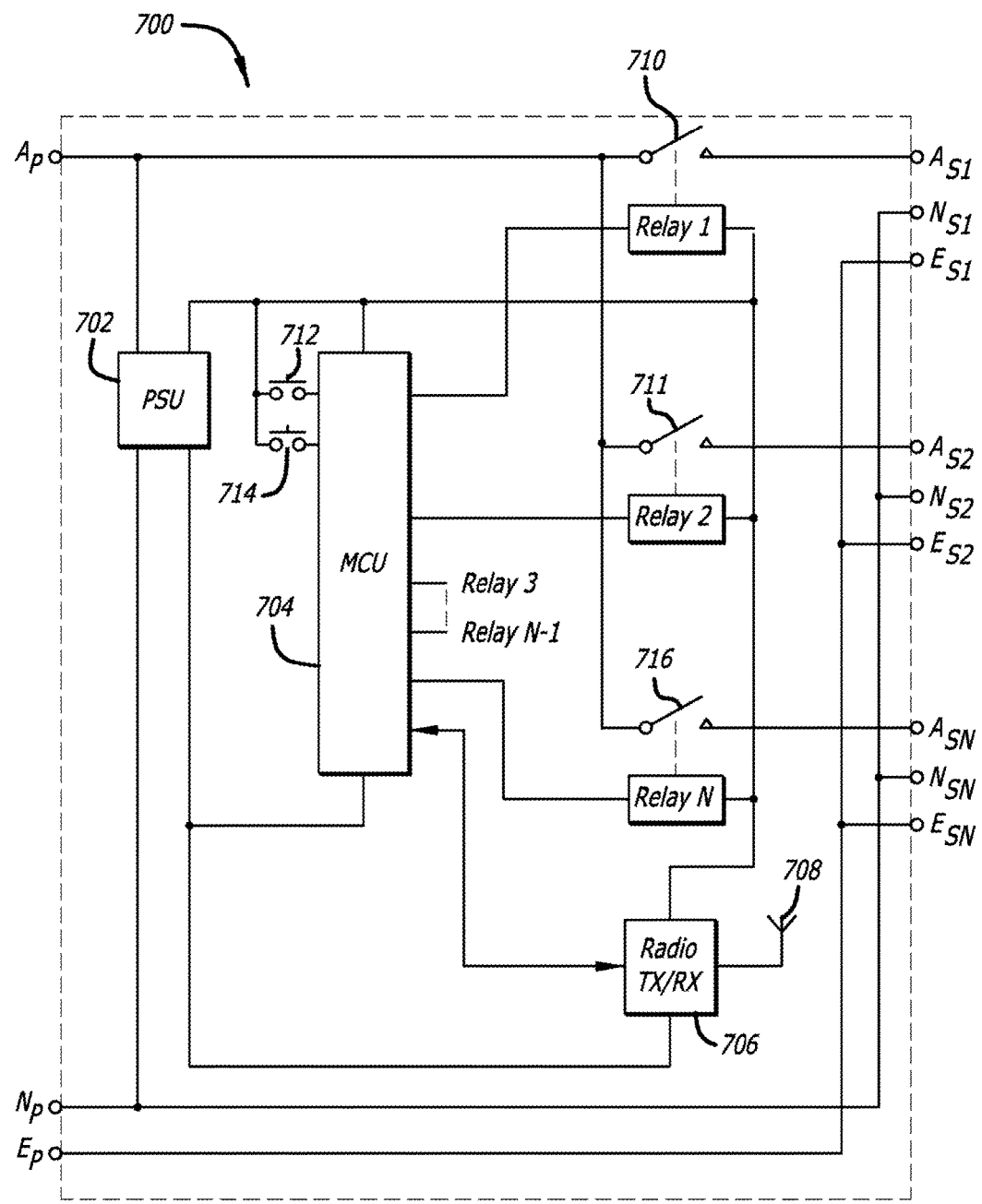
FIG. 9 is a block diagram of the functional electronics of a switch strip in accordance with another preferred embodiment of the present invention.

FIG. 9 is block diagram of a switch strip 700. Switch strip 700 preferably is composed of multiple switch units contained in a single housing with a common PSU 702, MCU 704 and radio 706. MCU 704 is configured to control multiple mains power outlets AS1, NS1, ES1 to ASN, NSN, ESN by controlling multiple relays 710, 711 through to 716.

Referring to FIG. 9, the component parts PSU 702, MCU 704, radio 706, aerial 708, relay 710, disconnect switch 712 and connect switch 714 preferably perform the same functions as described above for switch unit 400.

Switch strip 700 preferably plugs into a standard wall outlet or socket, and switch strip outlets (1) to (N) are preferably controlled by relay 710 (1) to relay 716 (N) so that the switch strip can be considered to be multiple switch units connected to a single electrical point. This is a similar concept to the many power boards available on the market except each switch strip outlet can be individually controlled via the Controller App running on a smartphone operating system.

All of the functions described above for switch unit 400 re preferably available to each outlet of switch strip 700. In addition, using of the Controller App, the user is preferably able to name each switch strip outlet individually with a meaningful notation so that, for example, Outlet 1 becomes "TV", Outlet 2 becomes "Stereo", and so on. The switch strip itself can be given a global name such as "Entertainment Unit."

The smartphone Controller App and MCU 704 with associated firmware are preferably able to group outlets so that a single function can be applied to a group of outlets. In this way separate outlets can be controlled at the same time such as powering off a PC, scanner and printer in 5 minutes time with one touch of the smartphones graphics screen 102. Different sub-groups of outlets may be controlled according to different programs.

It will also be appreciated that one or more of switch strip 700 outlets could provide the functions of a dimmer unit by replacing an outlet relay with dimmer control circuits 510 and appropriate MCU firmware.

Figure 10:
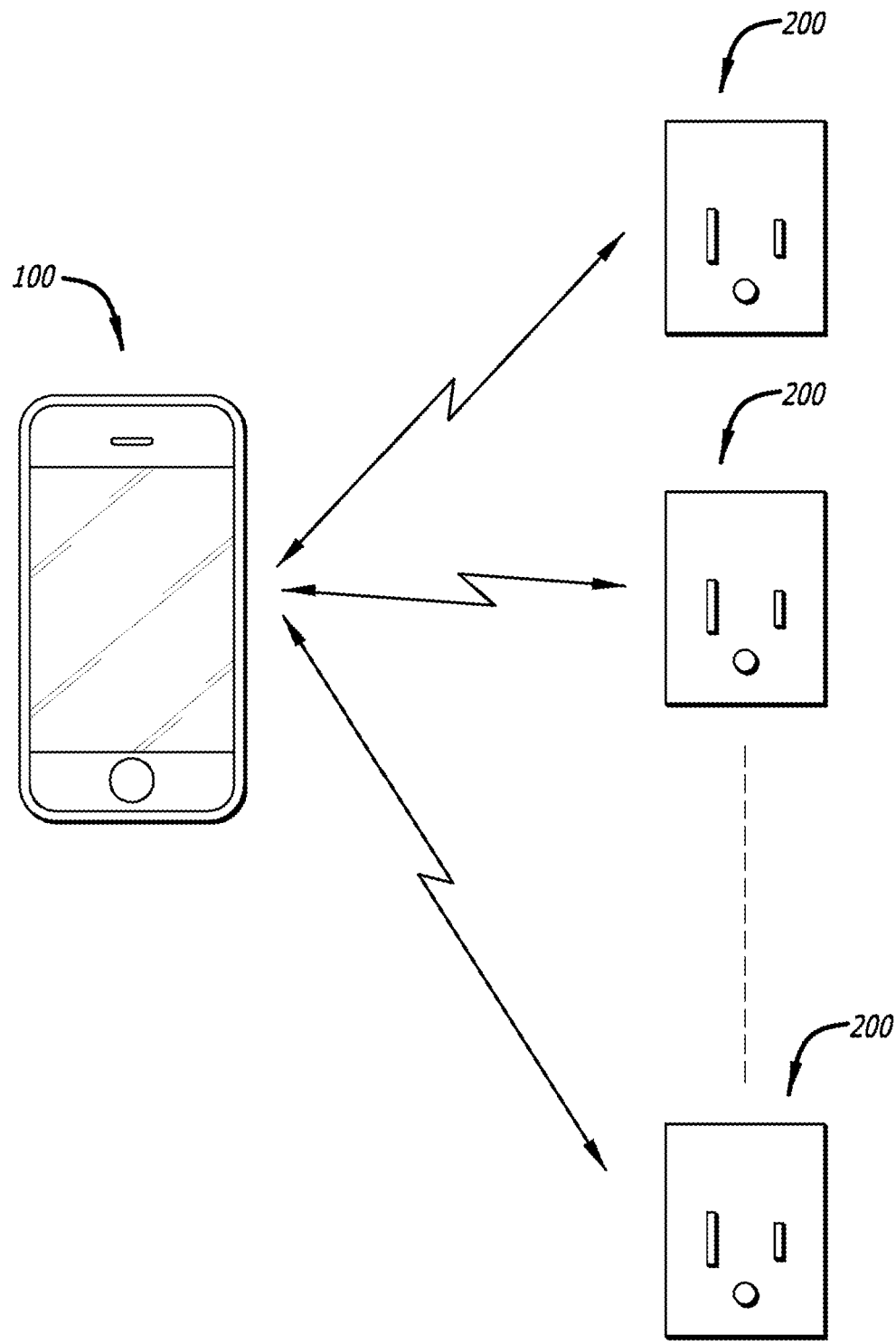
FIG. 10 is a system pictorial representation of the smartphone of FIG. 3 and a plurality of power control units.
Figure 11:
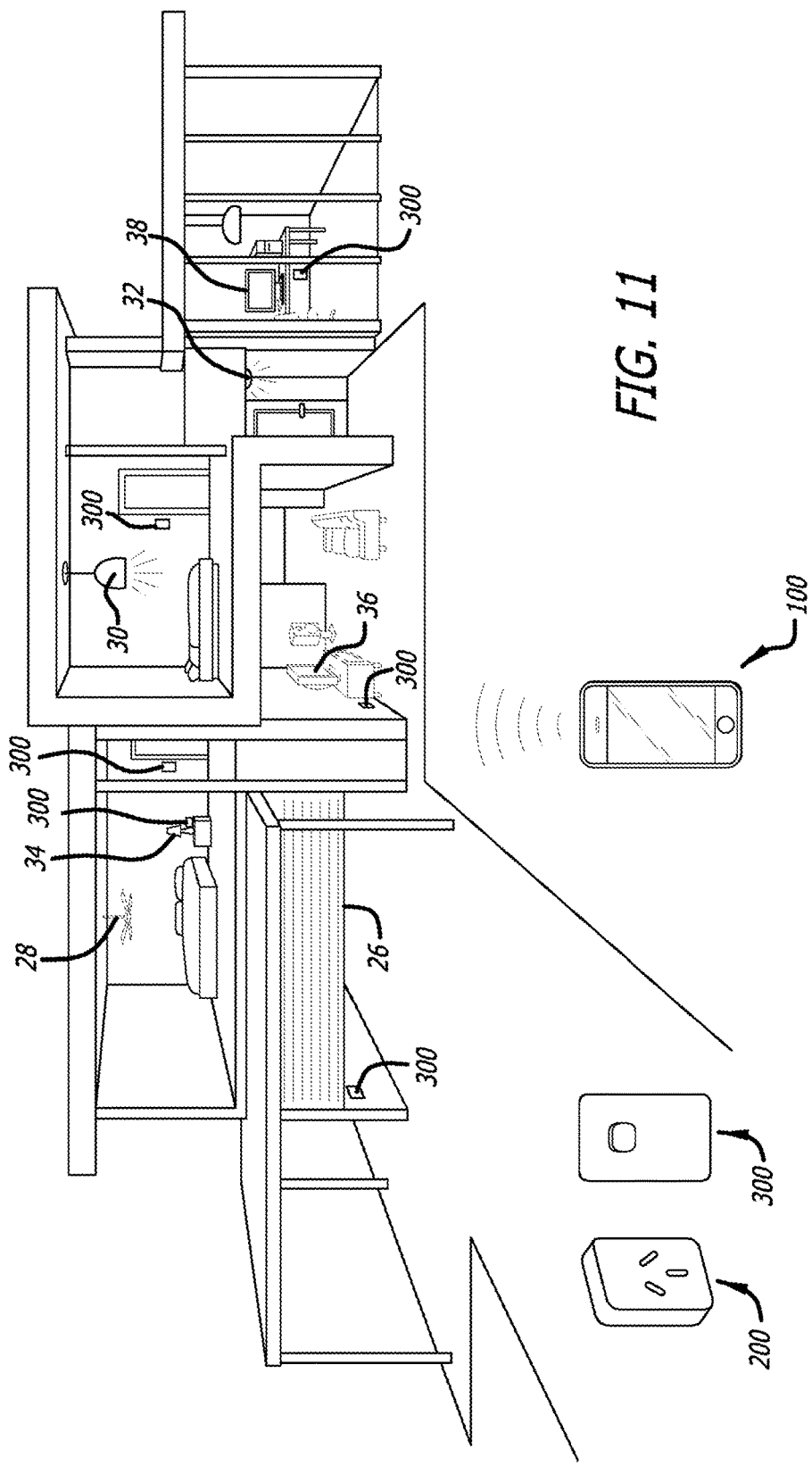
FIG. 11 is a pictorial representation of the uses of different embodiments of the power control unit in a domestic house.

FIGS. 10 and 11 show a representative system preferably utilizing a single smartphone 100 with a plurality of power control units 200.

Referring to FIG. 10, smartphone 100 communicates wirelessly to power control units 200 and is preferably a peer-to-peer system with no central hub. Preferably, the only wireless communications connection is a two-way link between the smartphone and each of the power control units. Preferably, each power control unit 200 includes a wireless interface such as radio 306.

While preferred embodiments of the present invention use a smartphone as its controller, and specifically a smartphone incorporating at least conventional Wi-Fi, and more preferably incorporating Wi-Fi Direct as well, other wireless communications systems such as Near Field Communications (NFC) or Bluetooth could be used depending on the specific requirements of the application of the invention. NFC is an extension of the ISO/IEC 14443 proximity card standard. NFC has a communication range of less than 0.2 m and a data rate of approximately 424 Kbit/s, but can be more than adequate for the data communications requirements of some preferred embodiments of the present invention.

Bluetooth allows properly configured Bluetooth devices to form peer-to-peer connections in a similar way to Wi-Fi Direct and in such situations, the Bluetooth wireless links may replace the Wi-Fi Direct wireless links and perform the same or similar functions.

Bluetooth and Wi-Fi Direct can coexist in the same frequency band and most smartphones have both Bluetooth and conventional Wi-Fi capability. Seeing as the Wi-Fi Direct specification requires only one of the connecting devices to support the Wi-Fi Direct standard, the extremely large installed base of smartphones which support conventional Wi-Fi implies that preferred embodiments of the present invention support the Wi-Fi Direct standard.

Bluetooth and Wi-Fi Direct are but two examples of two-way communication networks useable with preferred embodiments of the present invention. It is envisaged that future two-way communication systems based on other specifications, methods, technologies or protocols will be developed and be useable with preferred embodiments of the present invention. A peer-to-peer communication link is a preferred method because such an arrangement eliminates a need for one or more base stations or other intermediary devices, such as a wireless router or access point. Therefore, in a preferred embodiment of the present invention, such intermediary devices are specifically excluded so that communication between the controller and the power control unit is a peer-to-peer form of communication. Also excluded in a preferred embodiment is the use of conventional ad-hoc wireless technology as such technology is overtly complex in relation to any benefits such technology may otherwise provide.

Peer-to-peer communications offer many advantages over networks. For example, direct communication networks offer a higher level of security compared to conventional centralized server-based networks, and an opportunity for a user to selectively add ("plug-in") and/or exclude other devices in a wireless group from the controller.

It should be noted that all of the wireless communications methods suitable for the invention incorporate two way protocols and radio 306 incorporates a transmitter (TX) and a receiver (RX) so full duplex communications can be supported. It is possible to perform some of the functions using simple wireless communications such as the "sender" in a garage door controller. However, information needs to be exchanged between the controller and the power control unit to support such functionality.

Depending on cost and the desired operational functions, the power control units may include only a Wi-Fi Direct radio, only a Bluetooth radio, or both technologies. The Controller App may communicate with any mix of power controlling elements and radio technologies which seamlessly provide the best communications link as the user moves through a controlled space. This would allow a controlled space to be restricted to an approximate small radius from the controller or a large radius which provides increased flexibility for the user in the way the user configures and uses a preferred embodiment of the present invention.

FIG. 11 shows one preferred embodiment of the system in a residential setting. It will be appreciated that the system may be adapted for non-residential settings as desired. As shown in FIG. 11, the power control units may be differently configured depending upon the desired application. For example only, garage door 26, ceiling fan 28, built-in interior lighting 30 and/or exterior lighting 32 may be operated with a power control unit 300 mounted behind a face plate (similar to wall dimmer unit 600 described above) in conjunction with smartphone 100. Stand-alone lamp 34, entertainment equipment 36, and/or office equipment 38 may be operated with a respective power control unit 300 configured as a switch unit in conjunction with smartphone 100. It will be appreciated that the power control unit may be configured for a particular application as desired. For example, garage door 26 may be controlled with a switch unit instead of a unit mounted behind the face plate. Additionally, other smartphones may be configured for use with the system, though preferably only one smartphone will be able to access the system at a time.

Figure 12:
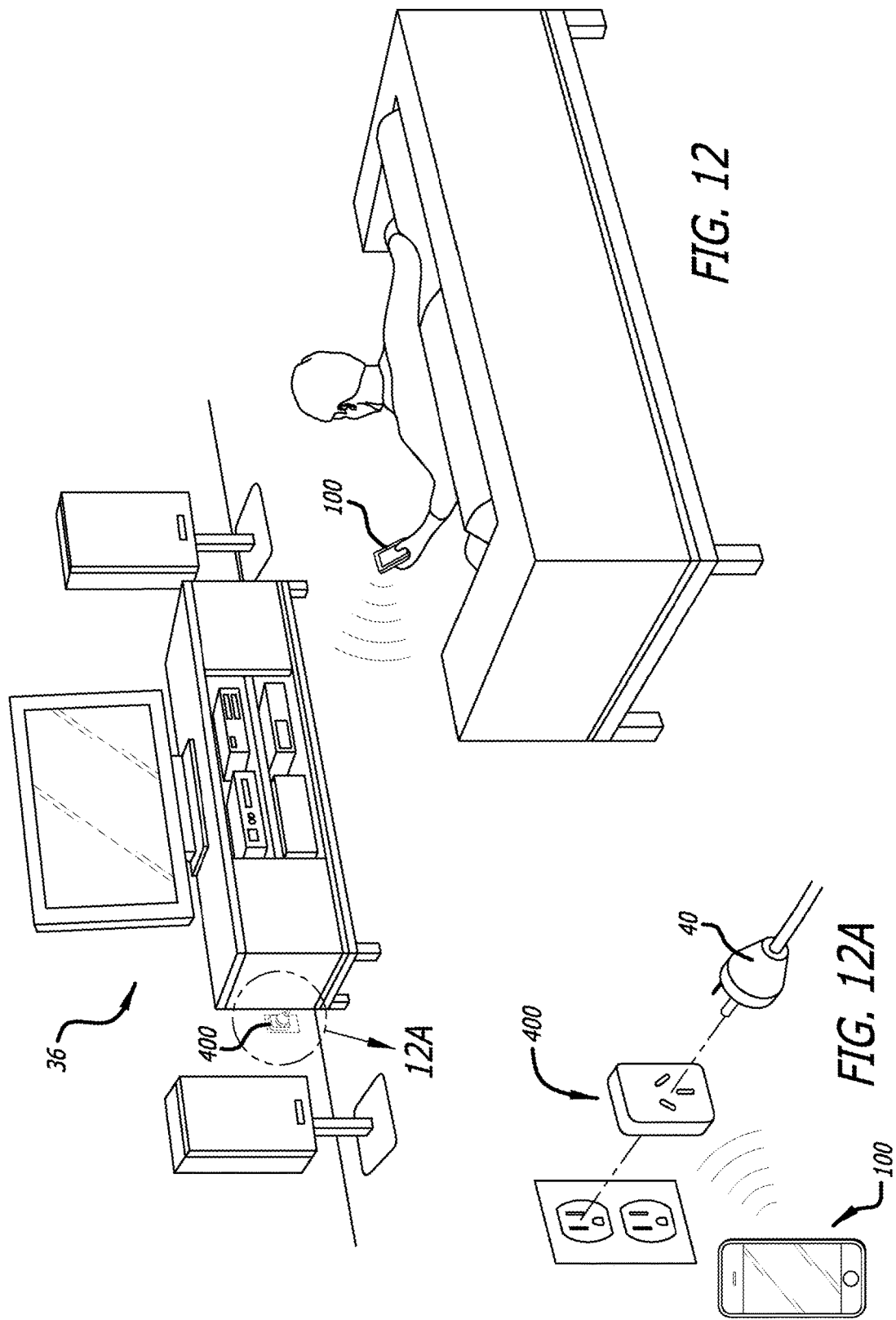
FIG. 12 is a pictorial representation of a power control unit being used to control a home entertainment unit.

Referring to FIG. 12, smartphone 100 is shown in use with power control unit formed as switch unit 400 to control power to entertainment equipment 36. A user may operate switch unit 400 to activate or deactivate power to one or more items such as a television or stereo equipment. Operating entertainment equipment in this fashion eliminates power consumption by entertainment equipment when they are in a "stand-by" mode, thus reducing energy costs.

FIG. 12A shows an expanded view of switch unit 400 configured for use with a plug 40. Plug 40 may be an electrical connection to a power strip or individual electrical items. As shown in FIG. 12A, smartphone 100 preferably communicates directly with switch unit 400 rather than entertainment equipment 36.

Referring to FIG. 13, smartphone 100 is shown in use with a wall mounted power control unit 300 to control power to ceiling fan 28. As shown in FIG. 13, a user may select a particular room or item with Controller App 106 on smartphone 100. For example, a user may select "ceiling fan" on the Controller App and either program wall mounted power control unit 300 for activation times or speeds to coincide with different times of the day. Alternatively, the user may activate, deactivate or change the speed of ceiling fan with smartphone 100 without pre-programmed times.

It is well known that as the ambient temperature cools overnight, it is preferred that the speed of a ceiling fan needs to slow down to lessen its cooling effect. However, in a bedroom this entails getting up in the early hours of the morning to change the fan speed. Accordingly, the wall mounted power control unit 300 may include an ambient temperature sensor to allow wall mounted power control unit 300, in conjunction with parameters selected by the user in the Controller App, to vary the ceiling fan speed in synchronism with the ambient temperature to provide the maximum cooling effect without becoming physically uncomfortable.

Figure 14:
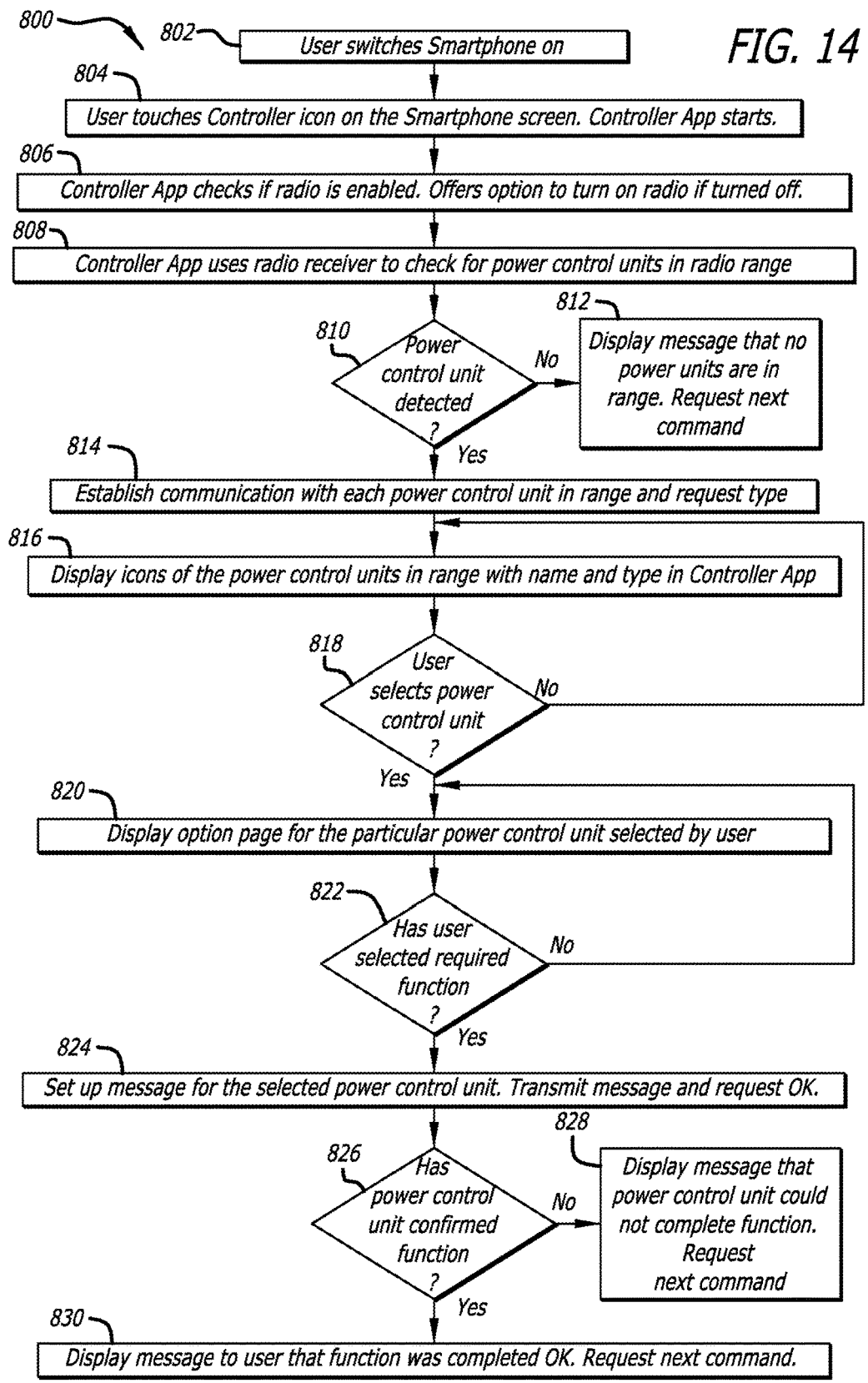
FIG. 14 is a flow diagram showing a sequence of events between a user and an applications program loadable onto the smartphone of FIG. 3.

FIG. 14 is a flow diagram of a method 800 that includes actions taken by a user to activate a power control unit in accordance with the user's instructions. Such actions are preferably conveyed to a power control unit by touching the available options presented by the Controller App for that particular power control unit. Referring to FIG. 14, in step 802, the user switches the smartphone ON and the smartphone operating system displays a number of icons on its graphics screen. The user may have to scroll or page the display to locate the icon for the Controller App depending on the smartphone operating system. Once located, in step 804 the user touches the Controller App icon and the Controller App activates. In step 806 the Controller App checks to see if the radio is active and if not, requests the user to turn it on. In some implementations, the Controller App may automatically turn the radio on. Once on, the Controller App in step 808 scans its radio frequencies looking for power control units within wireless communications range. If in step 810 no power control units are detected, the Controller App proceeds to step 812 and advises the user. In steps 814 and 816 if one or more power control units are detected the Controller App communicates with each to determine their name and type and displays this information to the user on the smartphone's graphical screen. If the user selects one of the displayed power control unit's icon in step 818, the Controller App in step 820 then displays the option page for that particular power control unit. In step 822, if the user selects a particular function for the active power control unit, the Controller App moves to step 824 and transmits the function command to the power control unit. In step 826, the Controller App checks for a response from the power control unit and if it is not received, informs the user and waits for the next command. If the power control unit confirms the function has been executed, the Controller App in step 830 advises the user that the function requested was executed and then waits for the next command.

It will be appreciated that the steps described above may be performed in a different order, varied, or certain steps omitted entirely without departing from the scope of the present invention.

The use of individual wireless remote controllers to control the functions of various devices is increasing rapidly and replacing the infra-red remote controllers that have been the mainstay for remotely controlling consumer electronic products for decades. Some audio equipment manufacturers have used wireless remote controllers for many years while other sections of the consumer electronics industry such as TV manufacturers have tended to use infra-red control. While each work equally well in most circumstances, wireless remote controllers have been envisaged to be superior because there was no need to have direct line of sight between the controller and the controlled device, however they are more expensive to manufacture, have to operate in specified radio frequency bands and can be subject to interference from other wireless devices.

In some applications such as garage door openers, only wireless remote controls are used because of the operational limitations of infra red control. Now that smartphones are becoming widespread, there are significant advantages in having one device to handle all of a person's remote control applications. However, there are hundreds of millions of installed wireless controlled devices which need to be serviced in the same way if the smartphone is truly going to become the only control device a user will need to carry to operate all of the remotely controlled devices they interface to on a day to day basis.

Figure 15:
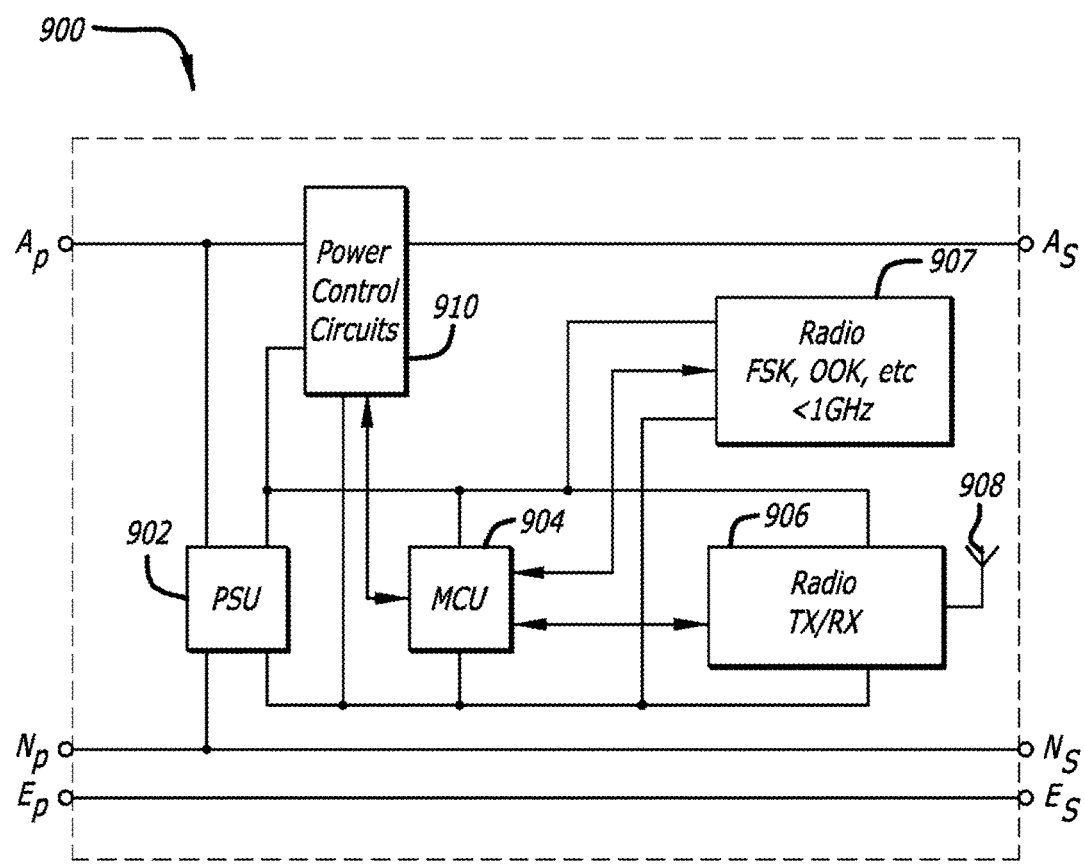
FIG. 15 is a block diagram of the functional electronics of a remote control unit in accordance with another preferred embodiment of the present invention.

Referring now to FIG. 15, a remote control unit 900 is shown in association with another preferred embodiment of the present invention. Remote control unit 900 is similar to power control unit 300 except that remote control unit 900 includes an additional radio 907, which preferably is a Sub 1 GHz radio. As shown in FIG. 15, the external plug connections Ap, Np and Ep correspond to plug 216 (FIG. 4B) and socket connections As, Ns and Es correspond to socket 208 (FIG. 4A).

Radio 907, the sub −1 Ghz radio may be a transmitter only or a transmitter and receiver depending on the remote device's requirements. Radio 907 may be configured by MCU 904 to operate at a number of different carrier frequencies and data can be modulated onto those carrier frequencies such that the encoded data can be received, decoded and acted upon by a compatible radio receiver in a remote device such as, for example only, a garage door opener, alarm system, and/or sprinkler system.

Radio 907 may be capable of FSK, GFSK, MSK, OOK or other modulation methods and be able to operate over a wide frequency range including the license free Industrial Scientific and Medical (ISM) frequencies. While these specifications are applicable to most wireless sensor networks, home and building automation, alarm and security systems and industrial monitoring and control, there may be applications where a system compatible transceiver with specific frequency and modulation specifications is required. In these situations, a specific radio 907 could be provided within the embodiment described herein.

There are many applications which currently use wireless remote communications with garage door openers, perimeter gates, music systems, blinds and movie projection screens being some of the more common. With garage door openers alone, the number of systems and their associated wireless controllers number in the hundreds of millions if not billions worldwide. To use a smartphone to control garage doors, it is preferable for the smartphone to be able to communicate with the garage door opener. Unfortunately, garage door openers use simple wireless communications systems with basic modulation methods which are mostly proprietary. In comparison, smartphones use complex wireless systems such as legacy Wi-Fi, Wi-Fi Direct and Bluetooth which conform to rigorous international standards and certifications to ensure interworking between products from all manufacturers worldwide.

To prevent interference from adjacent wireless control installations such as neighbouring garages, complex data security schemes such as rolling codes can be used to (a) make each installation individual and (b) prevent an intercepted radio transmission from being used for criminal purposes. Depending on the system design, MCU 904 and/or radio 906 are able to perform the required mathematical calculations to provide the correct control codes if required by a remote service.

Figure 16:
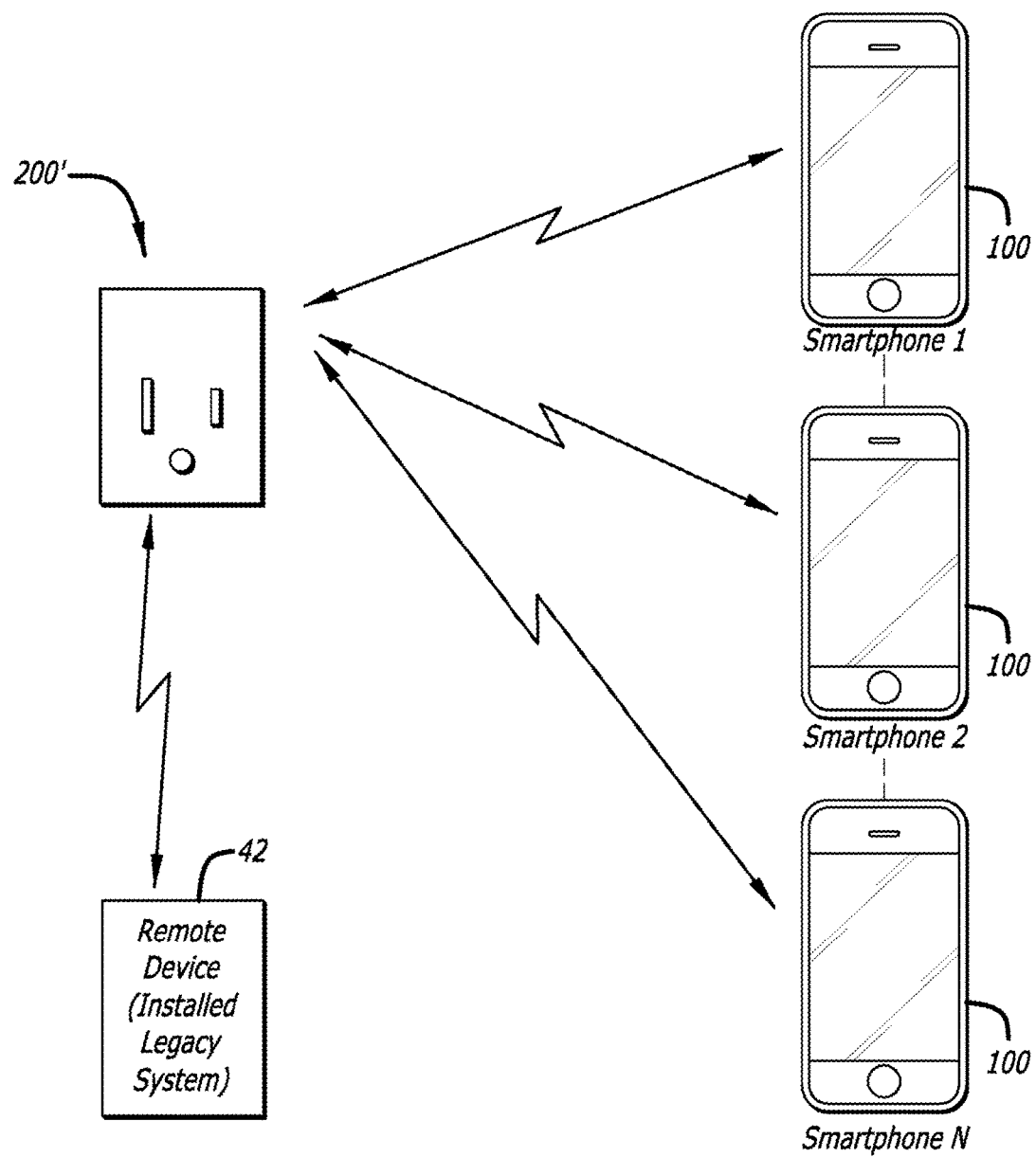
FIG. 16 is a system pictorial representation of a remote device, a remote control unit and a plurality of smartphones.

FIG. 16 is a system pictorial of a single power control unit 200', shown as a remote control unit embodiment, being able to communicate with N smartphones 100. As shown in FIG. 16, a single power control unit can be controlled by many smartphones using Wi-Fi Direct peer-to-peer communications on a 1:1 basis without the need for any other wireless network infrastructure. In the embodiment shown in FIG. 16, power control unit 200' is able to individually communicate with smartphones 100 using radio communications. Power control unit 200' may be provided as a remote control unit embodiment similar to remote control unit 900 described above, and preferably incorporates a sub 1 GHz radio which is used to communicate with a remote device 42, for example, an installed legacy system to be controlled by one or more of smartphones 100. The system shown in FIG. 16 will be described below in terms of remote control unit 900, though it will be appreciated that the system is not so limited.

When used as a remote control unit, remote control unit 900 preferably incorporates two radio transceivers, a Wi-Fi Direct radio to communicate with a smartphone and a sub 1 Ghz radio to communicate wirelessly with a remote device. If the remote system is a garage door opener, the installed legacy system remote device 42 would be the opening and closing mechanism for the door. In a typical legacy system, a special remote controller, sometimes referred to as a "clicker," would be used to send the "raise" and "lower" door commands to remote device 42. In this case, the remote controller would be a natural pair to the garage door controller which would only receive, decode and act upon radio signals, and the embedded data from the known individual remote controller. With the system represented in FIG. 16, remote control unit 900 emulates the standard remote controller supplied with the garage door opener and can perform the same function of the specific remote controller.

One way this can be achieved is for remote control unit 900 to learn the appropriate radio frequencies and codes required to operate the remote device. This method is dependent on the type of system involved, and for simple systems such as raising and lowering a movie screen, the simple data codes used could be learned by remote control unit 900. However, for a secure system such as a garage door opener which incorporates rolling security codes, this would not work because the code is different each time. This data mechanism deliberately prevents the recording and playback of the control codes, thus thwarting "learning" the operation of a remote controller.

However, it is envisaged that the system shown in FIG. 16 would not be installed without the knowledge of the original manufacturer so the operating frequencies, carrier modulation and code generation methods would all be known. The problem is how to upgrade a legacy system to be operated with a smartphone without having to replace a significant amount of the legacy system.

In this embodiment of the present invention, remote control unit 900 preferably has the capability to store the operating parameters of remote device 42 in its reprogrammable memory. Using these parameters, MCU 904 (FIG. 15) is able to emulate the functions of the original wireless remote control, and using sub 1 GHz radio 907, send the correct commands to remote device 42 such that it performs those functions in the same way.

However, it can be seen that to do this, remote control unit 900 would preferably have to be able to first, selectively communicate with every remote device ever built or likely to be built and second, be able to be selectively programmed to become the natural pair with the remote device it is required to control.

In this embodiment of the present invention, all remote control units 900 are preferably the same when they leave the factory and preferably do not necessarily have any stored information which will allow them to communicate with remote device 42. When an individual remote control unit is installed in a system, it is paired with a smartphone in the normal way which then, using the wireless communications link, allows data to be transferred between smartphone 100 and remote control unit 900. The user can use smartphone 100 to download a specific Controller App for the application or installation. Using touch sensitive graphics screen 102 of smartphone 100, the user can enter the system description information into the Controller App, which will fully describe remote device 42. This would also preferably include any specific parameters such as DIP switch settings, model types, etc., so that the Controller App is able to determine the operating parameters of remote device 42. These parameters are transferred from smartphone 100 via the wireless communications link and are stored in the reprogrammable memory of remote control unit 900 where they become part of the system operating functions to control remote device 42.

While this description assumes operating parameters would be sent from smartphone 100 to remote control unit 900, it does not exclude the sending of a complete functional program in the same way. Depending on the complexity of the control functions, it may be preferable to transfer a complete operational program entity for security purposes, update purposes, or because remote device 42 is a new model requiring a different basic operating program. Using the parameters received from the Controller App, remote control unit 900 can fully emulate the control frequencies, data and codes required to operate remote device 42. Alternatively, for a specific manufacturer it would be possible to select the actual remote controller type from a list presented to the user by the Controller App on the smartphone's touch sensitive screen, or a barcode corresponding to the remote device could be scanned. Depending on the complexity of the application and the type of remote device, additional information may need to be physically acquired from the remote device on its original setup parameters, but once all of the information was entered into the Controller App, remote control unit 900 would be programmed by smartphone 100 to emulate the original wireless remote controller.

Once remote control unit 900 has been programmed for compatibility with remote device 42, the same Controller App, or a specific functional Controller App, could be used to indirectly control the installed legacy system. If other smartphones also need to operate the installed legacy system, they could be paired with remote control unit 900 in the normal way. The users would also download an appropriate Controller App which would allow them to also control remote device 42 via remote control unit 900.

Figure 17:
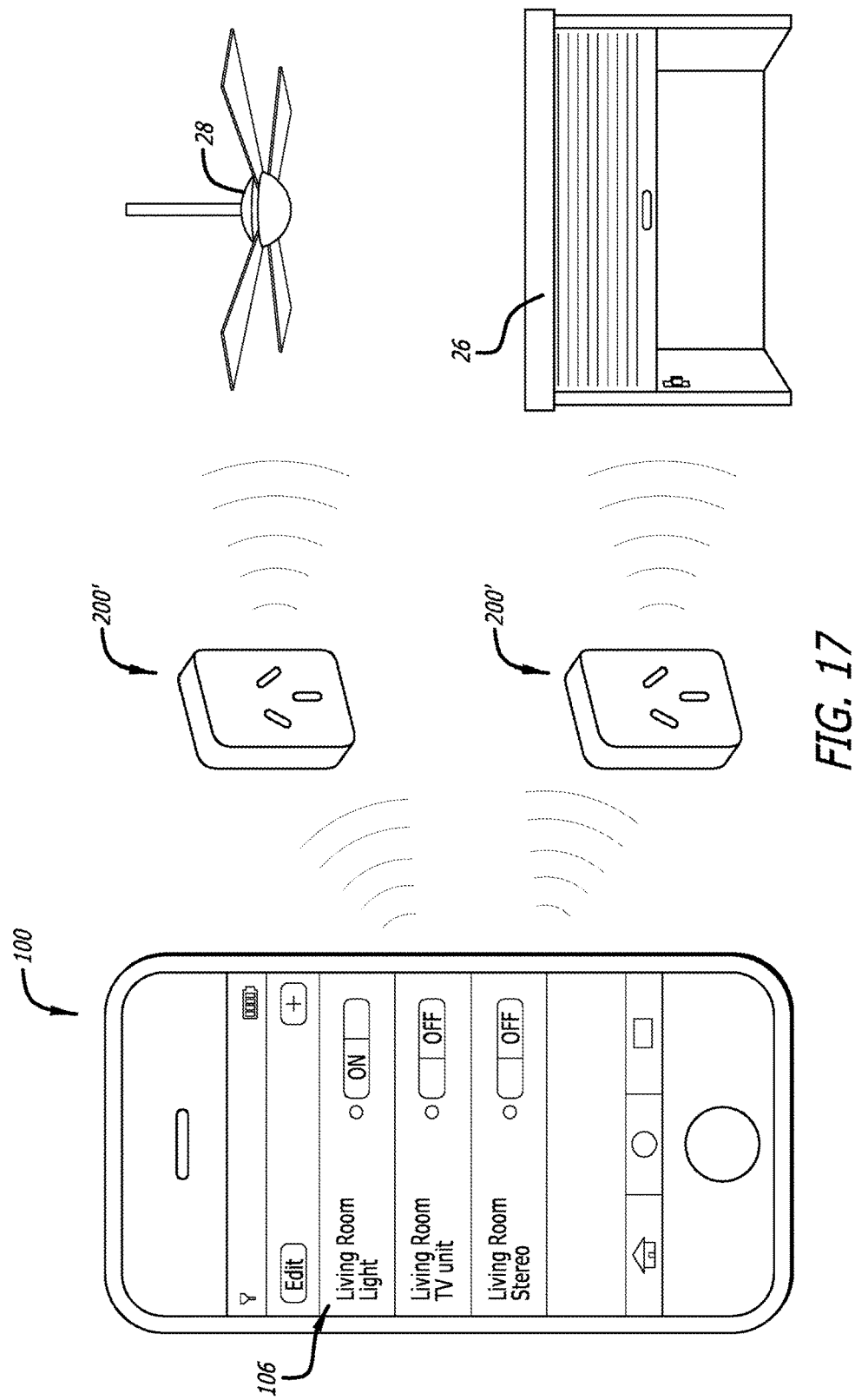
FIG. 17 is a pictorial schematic of the smartphone of FIG. 3 being used to remotely control a home ceiling fan and garage door in accordance with another preferred embodiment of the present invention.

Any smartphone that has been paired with remote control unit 900 and is running the Controller App for remote device 42 can control the remote device. For example, referring to FIG. 17, smartphone 100 is shown in use with a first power control unit 200' to control ceiling fan 28, and a second power control unit 200' to control the opening and closing of garage door 26. As shown in FIG. 17, a user may select a particular room or item with Controller App 106 on smartphone 100. For example, the user may select "garage door" on the Controller App and open or close garage door 26 with smartphone 100 through power control unit 200' (which is preferably configured as remote control unit 900). In the example of a garage door opener, the user would touch the screen of their smartphone to activate the garage door Controller App. Controller App 106 would display the available functions and, for this example, we will assume the emulation of a single button remote controller which can open or close garage door 26. The user would touch the open/close button representation on the screen to activate this function. The smartphone would send the open/close command to the remote control unit using the wireless communications system. The remote control unit would determine the open/close command is required and using the sub 1 GHz radio system, send the appropriate command to the remote device which would respond to the command by opening garage door 26 if closed or closing garage door 26 if it was open.

Continuing to refer to FIG. 17, a user may use the same smartphone controller to select "ceiling fan" on the Controller App and activate, deactivate or change the speed of ceiling fan with smartphone 100 through a power control unit 200' specifically configured for use with ceiling fan 28.

It will be appreciated that the system described above can be extended in many ways without departing from the scope of the present invention. For example only, the sub 1 GHz radio could be replaced with an electromechanical relay contact set for those systems which incorporate the activation of a single function by the use of a push button switch. This function is sometimes available on garage door opening systems and would allow a remote control unit which incorporated a relay contact set to replace the push button switch to be used to control the garage door. However, unlike the wireless remote control replacement, the connection between the remote device and the remote control unit would need to be physically installed, whereas a wireless connection would not.

As can be seen in FIG. 15, remote control unit 900 includes power control circuits 910 in the same way as power control unit 300 has power control circuits 310. While remote control unit 900 includes radio 907 to communicate to remote devices, it can still provide all of the power control functions described in relation to power control unit 300. By plugging a light or appliance into power socket As, Ns and Es and loading the appropriate Controller App applicable to the specific remote control unit, functions such as Power On/Power Off, Light On/Light Off, Light Dim, etc., can also be provided via remote control unit 900. FIG. 15 does not show external switches such as switches 312 and 314, however this is not a limitation to a remote control unit and external switches can be provided if the particular remote control unit requires them.

It will be appreciated that remote control unit 900 may be configured in a variety of ways without departing from the scope of the present invention. For example, the electronics subsystem of remote control unit 900 could be installed behind a light switch wall plate in which a separate mains power outlet would not be required. The power control circuits 910 could be utilized to provide light dimming functions or light On/Off functions for the lit space.

Remote control unit 900 could provide a wireless or hard wired interface to another independent control system which has a completely different set of control functions and/or operations. In this case remote control unit 900 may provide an interface between the other system and a smartphone. By being able to download functional subsets from a server via smartphone 100 and transfer them to the reprogrammable memory in the remote control unit, systems which do not have any inherent ability to be controlled by a smartphone can have their functionality extended instead of being replaced.

In another embodiment of the present invention, radio 906 in remote control unit 900 could be replaced with an alternative radio which supports a completely different wireless functionality. For example, there are many specific application devices available which conform to other standards such as Zigbee, Z-Wave, etc. While it may be useful to have devices which perform specific functions, it may not be applicable to replicate these functions with a Wi-Fi Direct system such as used in a preferred embodiment of the present invention. In these circumstances it can be seen that by providing a remote control unit with an appropriate radio 907, it is possible to provide a communication path between smartphone 100 and the remote device conforming to a different communications specification.

As appropriate Controller Apps may be downloaded into the smartphone, so that functions for the sub 1 GHz radio can be loaded into the remote control unit and executed, the same could be done for other systems such as Zigbee devices which are not compatible with legacy Wi-Fi, Wi-Fi Direct or Bluetooth devices.

Figure 18:
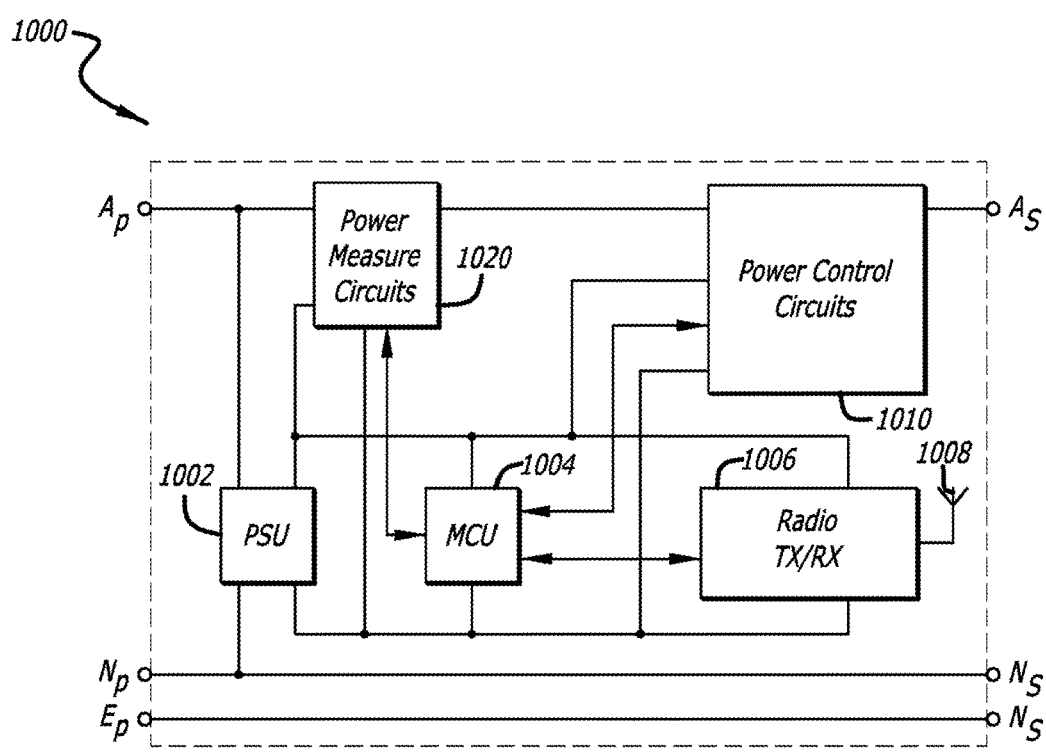
FIG. 18 is a block diagram of the functional electronics of a power save unit in accordance with one preferred embodiment of the invention.

Referring now to FIG. 18, power save unit 1000 is shown in accordance with another preferred embodiment of the present invention. Power save unit 1000 is similar to power control unit 300 except that power measure circuits 1020 have been included.

Power Save Unit 1000 includes external plug connections Ap, Np and Es corresponding to plug 216 (FIG. 4B), and socket connections As, Ns, and Es corresponding to socket 208 (FIG. 4A).

Power measure circuits 1020 allow the electrical parameters of the electricity transferred through the mains power outlet plug Ap, Np and Ep to be measured. These parameters are available to MCU 1004 so that the instantaneous Voltage, Current and Power, Irms and Vrms, Average Real and Apparent Power and Energy-to-pulse Conversion are available.

Using radio 1006, some or all of the measured electrical parameters could be sent to smartphone 100 via the communications link. Once stored in the smartphone, the Controller App would be able to perform additional calculations or conversions if required and display the results in a graphical format on the smartphone's touch sensitive screen for the user to view. Suitable processing of these parameters will allow information such as the instantaneous power being used by an attached device or appliance to be displayed. Power usage over time, total power used and trend analysis are also some of the useful representations of the basic electrical data that are preferably measured by power save unit 1000 and could be displayed to the user. By using the smartphone's Internet capability the Controller App could access the power company's rates and charges, and provide the user with usage and cost comparisons.

In addition to measuring and sending the instantaneous electrical parameters of the electricity being used by an attached appliance or device, power save unit 1000 is also preferably able to conserve power by turning off standby or 'vampire' power automatically when an attached appliance or device is not in use.

Using the Controller App and the wireless communication link between smartphone 100 and power save unit 1000, the user is able to set a threshold power limit. This can be accomplished by having any attached appliance or device in standby mode and then commanding the power save unit to measure and record the instantaneous power or alternatively, the user can enter the standby power limit manually via the smartphone graphics touch screen if it is known. The threshold power limit is preferably higher than the standby power limit, but lower than the operating power so that an instantaneous power measurement of less than the threshold power limit is taken to mean the attached device is switched off.

Power save unit 1000 preferably has an automatic shut down mode which requires the user to determine the time of day when power will always be available to the attached appliance or device. During this time, the attached appliance can be switched ON or OFF as required either via its own power switch or via power save unit 1000 using the switch ON or switch OFF commands of the Controller App. For convenience, this time period is called the normal time. The time outside of the normal time is called the shutdown time. An example of how these different times would be determined is if a normal office environment is considered, it would be expected that staff would be in the office from, for example, 6:00 am to 6:00 pm so this time period would be set in power save unit 1000 by the Controller App to be normal time. By default the time period from 6:00 pm to 6:00 am (night time) would be the shutdown time.

If power save unit 1000 supplied electricity to a computer workstation, for example, which could include a PC, a printer and a scanner, electrical power would always be available during the normal time and the computer workstation could be switched on and used normally. When 6:00 pm arrived, power save unit 1000 would check the amount of power being used by the attached appliance or device, in this case the computer work station. If the measured power was in excess of the standby limit, it would mean the computer workstation was still in use and no action would be taken.

However, if the measured power was less than the threshold limit, it would be mean the computer workstation had been turned off and the only power being used was standby or vampire power. When power save unit 1000 determines this condition, it would preferably disconnect the electrical power from its socket As, Ns and Es and the power would remain disconnected until the next 6:00 am time when it would be reconnected and ready for the computer workstation to be used for daily work.

In the situation where the standby power limit is exceeded at the start of the shutdown time, or 6:00 pm in this example, power save unit 1000 will continue to monitor the instantaneous power being provided. This allows the computer workstation to continue to be supplied with power without interruption. However when power save unit 1000 detects the computer workstation has been turned off by the instantaneous power becoming less than the threshold limit, the electrical power is disconnected from power socket As, Ns and Es and power save unit 1000 enters the shutdown time.

Although not shown in FIG. 18, each power save unit 1000 could incorporate the same external disconnect switch 312 and connect switch 314 as shown for power control unit 300 in FIG. 5. Pressing the connect switch would cause power save unit 1000 to terminate a shutdown time period and apply electrical power to power socket As, Ns and Es which will allow the computer workstation to be activated during the time power would normally be disconnected. After a predetermined time, power save unit 1000 will enter its normal shutdown time monitoring of the instantaneous power if the normal time has not been reached. If during the shutdown time the instantaneous power becomes less than the threshold limit, the power save unit will again disconnect electrical power to power socket As, Ns and Es.

Preferably at any time, power save unit 1000 can be switched ON or OFF by the Controller App running on smartphone 100, irrespective of the time of day.

In another example the power save unit may be configured to only supply power to devices which require less than a predetermined maximum. The user may instruct power save unit 1000 to monitor the power being used by an attached device, and if the predetermined maximum is exceeded, to disconnect the attached device. A similar application may be used to protect attached devices after a mains power failure or a device fault at well below the power level required to trip a primary circuit breaker.

It will be appreciated that being able to measure the power being used by an attached device allows any number of power saving, controlling, regulating, and protecting applications to be devised which will be apparent to those skilled in the art of which only limited examples have been provided. It will also be appreciated that the description of the operation of power save unit 1000 above is exemplary and other more complex power saving methods can be devised within the scope of the present invention.

Referring again to FIG. 15, in another preferred embodiment of the present invention, two remote control units 900 may wirelessly communicate with each other via their sub 1 GHz radio 907. While radio 906 is preferably used to wirelessly communicate with smartphone 100, suitable proprietary command and control protocols can be devised by those skilled in the art so that full duplex communications between two remote control units can be established using the sub 1 GHz radios 907. In this embodiment it is not necessary for one of the two remote control units 900 to be able to communicate with smartphone 100 as this can be done indirectly via the other remote control unit 900. Therefore, a radio 906 can be omitted from one of the remote control units 900 to save cost and power.

As used for this preferred embodiment of the present invention, the term master remote control unit will refer to remote control unit 900 shown in FIG. 15, which includes radio 906. The term slave remote control unit will refer to a remote control unit 900 which has radio 906 removed, but is preferably identical in all other respects.

The master remote control unit and slave remote control unit preferably wirelessly communicate with each other using their sub 1 GHz radio. The master remote control unit preferably wirelessly communicates with smartphone 100 using Wi-Fi Direct and radio 906. It should be noted that the sub 1 GHz radios can conform to any desired standard including proprietary requirements as long as they are able to be legally operated in the country of use.

This embodiment of the present invention is determined to be able to form simple, multi-device power control groups where there is one master remote control unit which is able to communicate with and control a specified number of slave remote control units. In this preferred embodiment, each master remote control unit would control, for example only, four slave remote control units which would function as a self contained group, although it can be seen that the number of slave remote control units in a group can be more or less than four depending on functional requirements. Because the slave remote control units only need to execute simple functions, for example only, power on/off, light on/off or light dim, they would be very low cost devices which consume very little power. More complex functions may be controlled by the master remote control unit which, in conjunction with the smartphone Controller App, would issue the basic function commands to each of the four slave remote control units as required, although ultimately the timing and sequencing of these basic commands may be determined by the user.

The system described in this embodiment preferably provides up to five separate power control devices (1 master and 4 slaves) which are envisaged to constitute a group by being in reasonably close proximity to the master remote control unit. For example, a power control group could control lights and power in the same room or in adjacent rooms, but not necessarily over the total area of a house. The user preferably has control of the group of up to five power control units individually or in other more complex arrangements through the Controller App running on smartphone 100. Using the Controller App, the user could set up one or more profiles for the group such that different power and lighting arrangements could be defined and allocated recognisable names such as "Arrive Home", Watch TV", "Chill Out" etc. A profile would be activated from smartphone 100 such as, for example, the "Arrive Home" profile, which could turn on appropriate lights within an apartment from outside the front door before it is opened, ensuring the apartment is lit before the user enters. It is apparent that the permutations of power and lighting functions which could be achieved using this arrangement is very large and the examples given are indicative only and not limiting.

The smartphone 100 and/or the Controller App may include voice recognition capability that would analyze the digital representation of an analog voice command and determine the required function spoken by the user. The Controller App would automatically engage the selected power control unit in a series of requests and commands which would conform to a predetermined protocol resulting in the power control unit executing the user's spoken command. An example of a function controlled by a Controller App voice recognition and activation capability would be the opening of a suitably equipped garage door. In this case smartphone 100 may be operating in "hands free mode" and the Controller App would be running in voice recognition mode. When the user is ready to leave the garage, they would say "open door," which would be received by smartphone 100 as a normal analog voice command in the same way as if the smartphone was being used for a phone call. The Controller App would interpret the digital form of the analog "open door" command and start a sequence of instructions and checks with the garage door controller which, if a predetermined protocol is adhered to, results in the garage door being opened. A similar sequence of commands between smartphone 100 and the garage door controller would be in response to a voice command "close door" which would cause the garage door to being closed.

Figure 19:
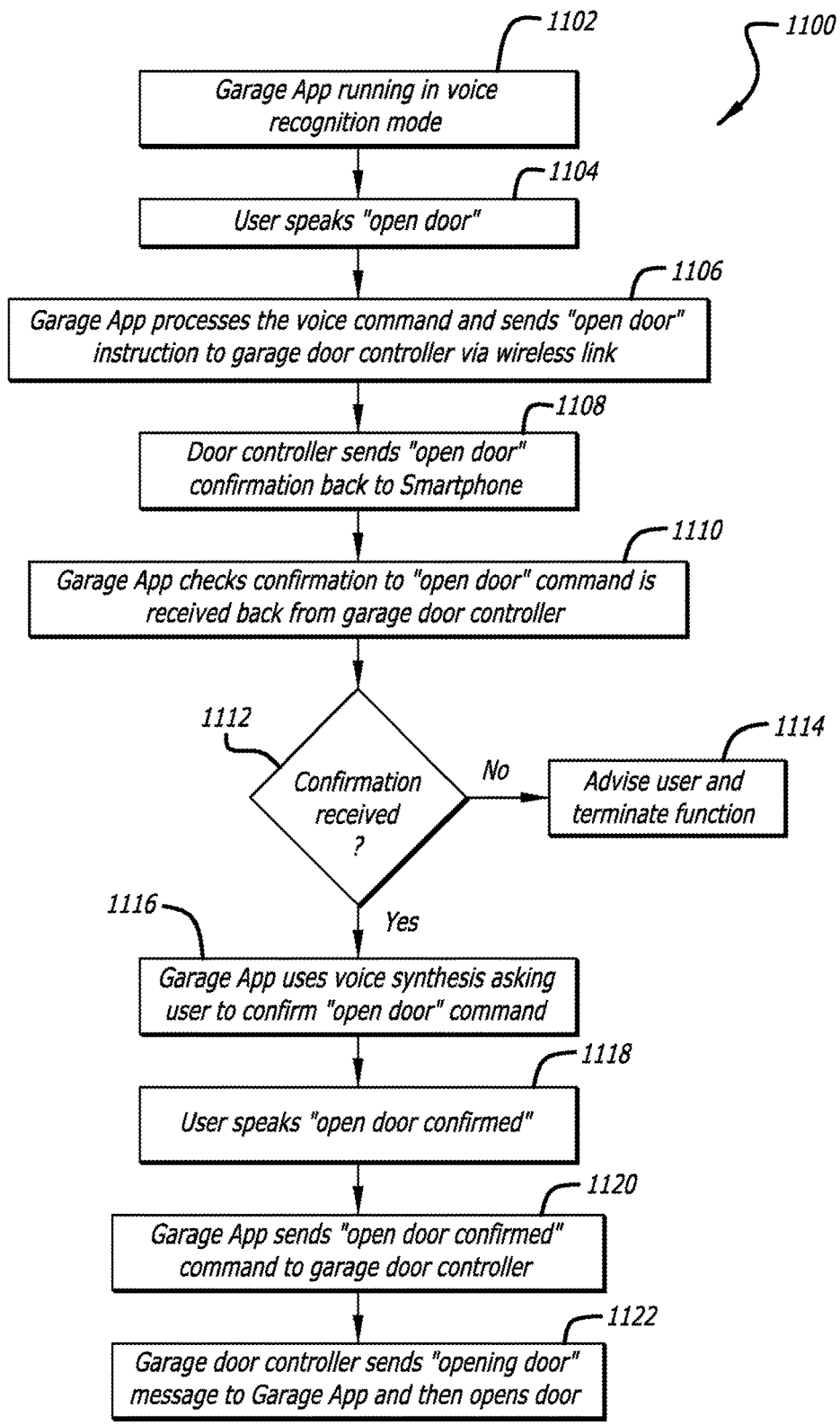
FIG. 19 is a flow diagram showing a sequence of events using voice activation by an applications program to close a garage door.

FIG. 19 shows method 1100 as a flow diagram of exemplary actions, commands and responses between a user and the smartphone, and the smartphone and the power control unit being used in conjunction with a garage door controller so that a spoken command by the user is recognized by the system causing the garage door to be opened. In particular, method 1100 includes running an exemplary Garage App, which may be a sub App of the Controller App, in a voice recognition mode in step 1102. In Step 1104, the user speaks "open door." The Garage App processes the voice command in step 1106 and sends an "open door" instruction to the garage door controller by way of a wireless link. The door controller receives the request from the Garage App and responds in step 1108 with a confirmation it has received the "open door" command. The Garage App waits for the response from the door controller in step 1110 and if it is not received or is incorrect, then in step 1112 it proceeds to step 1114, where the user is informed the door opening request failed and the request is terminated. If the response from the door controller is correct, the Garage App proceeds from step 1112 to 1116 and using voice synthesis asks the user to confirm their request to open the garage door. In step 1118 the user responds by speaking "open door confirmed" whereby in step 1120 the Garage App sends the "open door confirmed" response to the garage door opener, completing the user request to open the garage door. The garage door opener confirms it is "opening door" in step 1122 and then proceeds to complete the requested function by opening the garage door.

It will be appreciated that the steps described above may be performed in a different order, varied, or certain steps omitted entirely without departing from the scope of the present invention.

It will be appreciated that voice activation and control may be employed with any of the embodiments described above. In further embodiments of the present invention, the use of voice activation and control may also be incorporated into other power control and remote control applications. This allows, for example, a Controller App having voice recognition capability to be used in conjunction with remote control units to activate remote devices with spoken commands. It will be appreciated that this embodiment of the invention does not require alteration to an existing radio signal activated remote wireless control device for it to perform its functions.

It will be appreciated that the voice recognition and activation of a power control unit could be integrated into a separate third party application program (App) allowing for voice control of a power control unit by an App running broader services than is provided by the Controller App only.

It will be appreciated that the system and method of the present invention may be applied in a variety of residential and/or commercial environments. For example only, a power control unit may be attached to or integrated with a garage door opener drive so that a controller, such as described above, may be used to actuate the garage door opener drive. A power control unit may also be attached to or integrated with an alarm system for use with a controller such as described above. A power control unit could be attached to, or integrated with, motorized curtains, blinds, awnings or movie screens so that a controller, as described above, may be used to activate the curtains, blinds, awnings or movie screen. A power control unit could be attached to, or integrated with, a pool filtration system or pool/garden lighting system so that the controller, as described above, may be used to activate and/or program operation of the system. A power control unit could be integrated into a battery operated irrigation device which regulates the flow of water from its input, normally a water faucet, to its output, normally a hose connection. Such devices normally have complicated setup procedures and a controller, as described above, may be used to activate and/or program the control of the battery operated irrigation device. A power control unit could be attached to, or integrated with a room air-conditioning unit so that a controller, as described above, may be used to activate the air-conditioning unit. A power control unit could be attached to, or integrated with a room ceiling fan so that a controller, as described above, may be used to activate the ceiling fan and control its speed. A group of power control units, dimmer control units or both could used to control the lighting in SME or commercial retail space which are larger than domestic spaces.

A single controller may be used in conjunction with a plurality of systems. For example, the controller may be used to control any one or more of a lighting system in one or more rooms, an environmental control system such as electric heating, an alarm system, a garage door opener, an appliance such as a television or stereo, and any other ancillary device and/or system requiring electricity.

In another preferred embodiment of the present invention the smartphone itself may include a provision for voice recognition and activation. In many applications the ability to activate a power control unit with spoken commands is a significant capability for both ease of use and safety.

It will be appreciated that as used herein, the phrase "power control unit" is used to describe an intermediary device, for example, acting between an electrical apparatus or system, and a controller. For example only, the switch unit, dimmer unit, wall dimmer unit, switch strip, power measure unit, remote control unit and power save unit described above are exemplary forms of a power control unit.

Preferably, the system in one or more of the preferred embodiments is configured to operate without a router or access point. In another preferred embodiment of the present invention, the system is configured to be cordless (i.e., operate without the use of an electrical cord).

The features described with respect to one embodiment may be applied to other embodiments, or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A power control device for controlling an electrical apparatus, said power control device utilizing a peer-to-peer link between said power control device and a mobile communications device so as to control a supply of electricity to the electrical apparatus, the mobile communications device having a processor, a memory, a user interface, and a wireless communications transceiver, said power control device comprising:
    a microprocessor having a memory;
    a power control circuit within said power control device, said power control circuit being configured to implement a command from said microprocessor to vary the supply of electricity to the electrical apparatus; and
    a wireless communications transceiver operable for two-way, peer-to-peer communication with the mobile communications device, said microprocessor being configured to always send, using said wireless control transceiver, a discovery message without passing through a wireless router or access point, the discovery message being sent to initiate contact with the mobile communications device to open a peer-to-peer wireless communications link with the mobile communications device, said wireless control transceiver being configured to operate by simulating a network access point in establishing a peer-to-peer link with the mobile communications device.

2. The device of claim 1, wherein said microprocessor is configured to send the discovery message at a predetermined interval of time to ascertain whether the mobile communications device is in radio range of said device.

3. The device of claim 1, wherein the mobile communications device utilizes Wi-Fi Direct to communicate.

4. The device of claim 1, wherein said microprocessor is configured to communicate only to the mobile communications device once the secure link has been opened between said microprocessor and the mobile communications device.

5. The device of claim 1, wherein said power control device includes an active plug terminal for plugging into an electrical wall socket.

6. The device of claim 1, wherein said power control device includes an active socket terminal for plugging electrical appliances or equipment.

7. The device of claim 1, wherein said power control device is mountable behind a faceplate of a light switch.

8. The device of claim 1, wherein said power control device is mountable behind a faceplate of the electrical socket.

9. The device of claim 1, wherein said power control device includes an terminal block for integration into the mains wiring of a building.

10. The device of claim 1, wherein said power control device is integrated with the electrical apparatus.

11. The device of claim 1, wherein said microprocessor is programmed with time dependent functions by the mobile communications device.

12. The device of claim 1, wherein said power control device is configured to measure voltage being applied across and the current passing to the electrical apparatus electrically coupled to said power control device.

13. The device of claim 1, wherein said power control device is programmed to monitor power being consumed by the electrical apparatus electrically coupled to said power control device, and to disconnect said electrical apparatus if a predetermined maximum power is exceeded.

14. The device of claim 1, further comprising a second wireless communications transceiver.

15. The device of claim 14, wherein said second wireless communications transceiver is configured for transmitting and/or receiving signals no greater than 1 GHz.

16. The device of claim 14, wherein said second wireless communications transceiver is configured to support a wireless specification selected from one of ZigBee, Bluetooth, and near field communications.

17. The device of claim 1, wherein said memory of said microprocessor is a non-volatile re-writable memory, said microprocessor being configured to store in said non-volatile re-writable memory operating parameters associated with the electrical apparatus.

18. The device of claim 1, wherein said microprocessor is programmed to shut off electricity to the electrical apparatus when the mobile communications device travels out of range of said wireless communications transceiver of said power control device.

19. A method for remotely controlling an electrical apparatus to control a supply of electricity to the electrical apparatus, the method comprising:
    opening, without a wireless router or access point, a two-way, peer-to-peer wireless communications link between a wireless mobile communications device and a power control device, the power control device controlling the supply of electricity to the electrical apparatus, the power control device always sending a discovery message to initiate contact with the wireless mobile communications device to open the peer-to-peer wireless communications link with the mobile communications device, the power control device operating by simulating a network access point in establishing a communication link;

displaying on a user interface of the wireless mobile communications device a status of the power control device;
transmitting a command with the wireless mobile communications device over the peer-to-peer wireless communications link to the power control device to vary the supply of electricity to the electrical apparatus;
receiving the command at the power control device; and
varying the supply of electricity to the electrical apparatus in accordance with the command.

20. The method of claim 19, wherein the communications link between the power control device and the wireless mobile communications device is the only communications link opened with the power control device.

21. The method of claim 19, wherein the link is opened using Wi-Fi Direct communication technology.

22. The method of claim 19, further comprising measuring power being consumed by the device.

23. The method of claim 22, further comprising terminating the supply of electricity to the electrical apparatus when the power being consumed by the electrical apparatus reaches a predetermined maximum limit.

* * * * *